US006821204B2

(12) United States Patent
Aonuma et al.

(10) Patent No.: US 6,821,204 B2
(45) Date of Patent: Nov. 23, 2004

(54) GAME SYSTEM AND GAME PROGRAM

(75) Inventors: Eiji Aonuma, Kyoto (JP); Yoichi Yamada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 171 days.

(21) Appl. No.: 10/247,736

(22) Filed: Sep. 20, 2002

(65) Prior Publication Data

US 2003/0216177 A1 Nov. 20, 2003

(30) Foreign Application Priority Data

May 17, 2002 (JP) ........................................ 2002-142896

(51) Int. Cl.[7] .................................................. A63F 9/24
(52) U.S. Cl. .......................................... 463/32; 463/43
(58) Field of Search ............................... 463/1, 30, 31, 463/32, 33, 34, 37, 43, 44

(56) References Cited

U.S. PATENT DOCUMENTS

| | | | |
|---|---|---|---|
| 4,685,070 A | 8/1987 | Flinchbaugh | |
| 4,831,548 A | 5/1989 | Matoba et al. | |
| 4,835,528 A | 5/1989 | Flinchbaugh | |
| 4,845,643 A | 7/1989 | Clapp | |
| 4,855,939 A | 8/1989 | Fitzgerald, Jr. et al. | |
| 4,857,902 A | 8/1989 | Naimark et al. | |
| 6,132,315 A | * 10/2000 | Miyamoto et al. | ............ 463/43 |
| 2001/0049301 A1 | * 12/2001 | Masuda et al. | ................ 463/33 |

\* cited by examiner

*Primary Examiner*—Kim Nguyen
(74) *Attorney, Agent, or Firm*—Nixon & Vanderhye P.C.

(57) ABSTRACT

The present invention is directed to a game system that displays a 3-D game screen and a 2-D map screen for representing a 3-D game space. The present game system includes a 2-D map screen display control section, a cursor operating section, a first cursor movement control section, a 3-D game screen display control section, and a second cursor movement control section. The 2-D map screen display control section is to display the 2-D map screen including a first cursor. The cursor operating section is operated by a player. In accordance with an operation of the cursor operating section, the first cursor movement control section moves the first cursor on a 2-D field map. The 3-D game screen display control section is to display the 3-D game screen including a second cursor. The second cursor movement control section moves the second cursor in the 3-D game space in relation to a movement of the first cursor on the 2-D field map.

22 Claims, 25 Drawing Sheets

Fig. 20
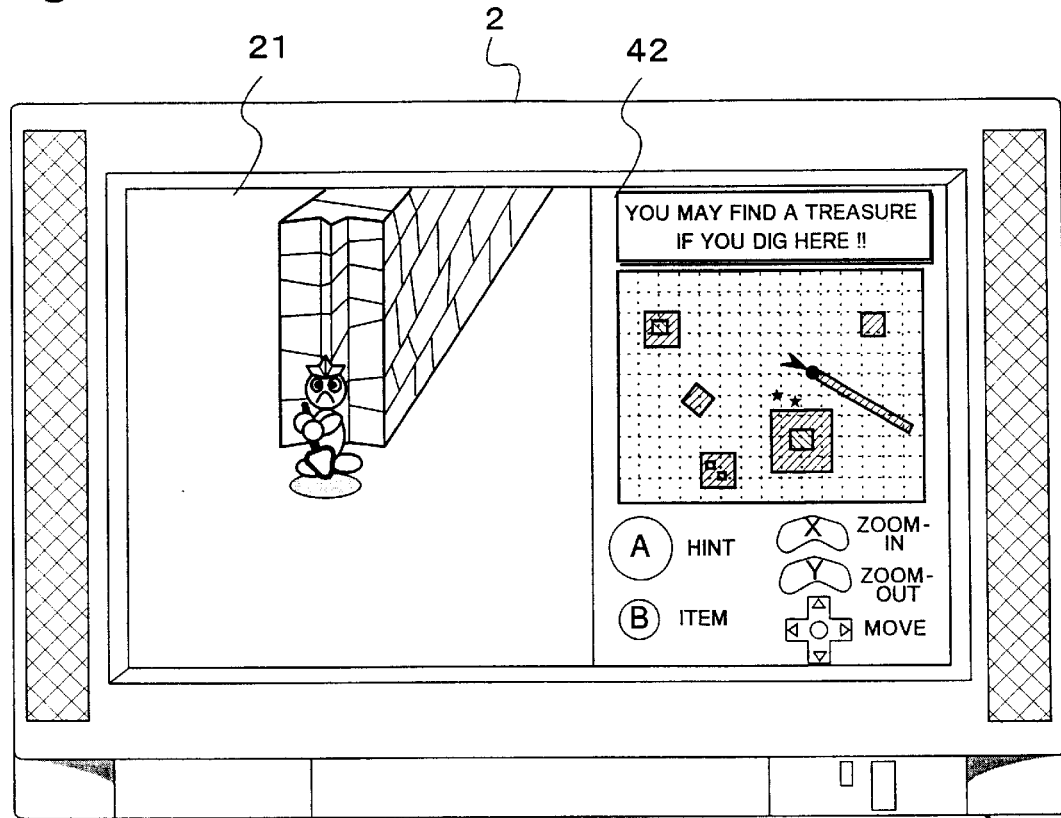
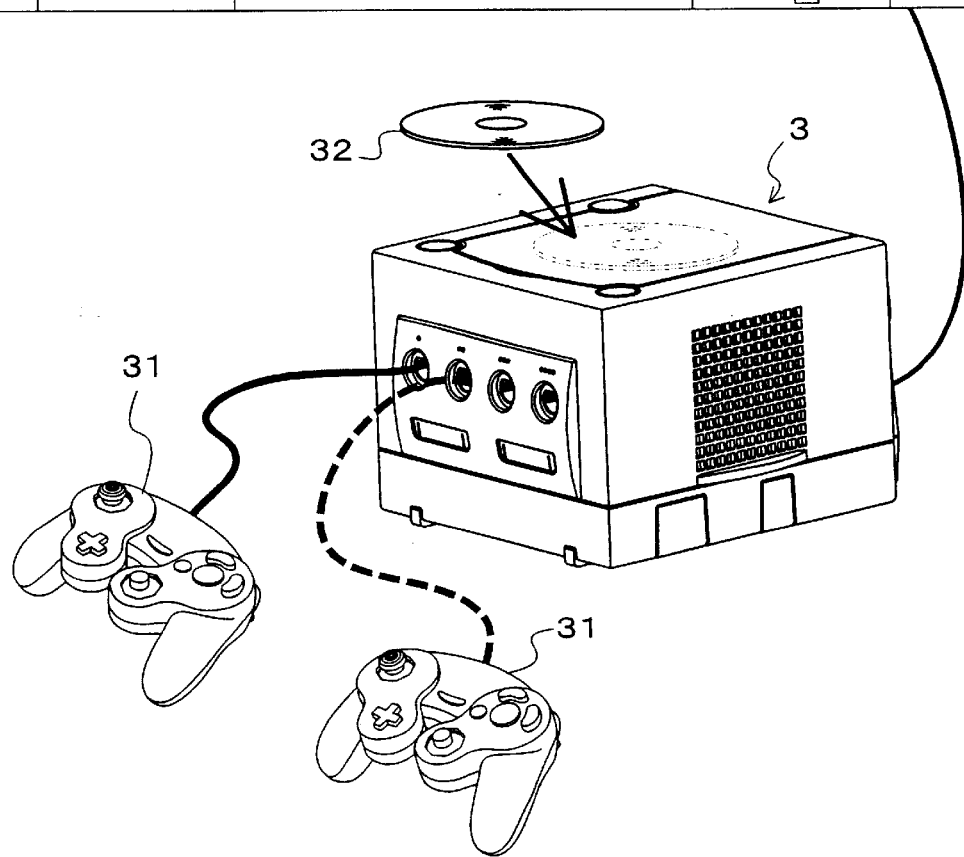

GAME SYSTEM AND GAME PROGRAM

BACKGROUND OF THE INVENTION

1. Field of the Invention

The present invention relates to game systems and game programs and, more specifically, to a technique for enabling easier three-dimensional (3-D) game play.

2. Description of the Background Art

In recent years, more 3-D games with 3-D computer graphics technology become available as the capability of computers incorporated in game systems becomes higher. In a 3-D game, objects composed of polygons, such as a player object and geometric objects, are arranged on a 3-D game space in a 3-D coordinate system, and the 3-D game space is displayed as a 3-D game screen being viewed from a viewpoint (virtual camera) that is set, for example, at the back of the player object. Such 3-D game space is displayed on a two-dimensional (2-D) plane, such as a television screen. Therefore, when a player operates the player object while viewing the television screen, it is difficult to get a sense of the 3-D game space, especially, a sense of depth. Furthermore, in general, the viewpoint is moved according to movement of the player object operated by the player, and therefore the player tends to lose a sense of direction and the like in the game space. For this reason, it is difficult to move the player object as the player wishes.

Conventionally, to get around these drawbacks, some game software products allow the 3-D game screen to be displayed together with a zoomed-out map screen for displaying the entire 3-D game space as a simple 2-D screen. An example of such game software product is "The legend of Zelda" (registered trademark)" for "NINTENDO 64 (registered trademark)" both marketed by Nintendo, Co., Ltd. In this game software product, a 3-D game screen has a zoomed-out map screen superposed thereon for display. This zoomed-out map screen is structured so as to have a 2-D field map image representing a plan view of the entire 3-D game space viewed from the top with simple marks superposed thereon for indicating the location and direction of the player object and the like in the entire 3-D game space.

In such 3-D game, with the aid of the zoomed-out map screen, the player can grasp the location and direction of the player object and the like in the entire game space.

Such 3-D game, however, has another drawback as follows. That is, the zoomed-out map screen is a screen for indicating the location of the player object and the like to make the player roughly understand where he or she is. Therefore, to operate the player object, the player still has to view the 3-D game screen, making it difficult to grasp the sense of depth. Similarly, for setting a mark in the 3-D game space while viewing the 3-D game screen, it is extremely difficult to accurately move the mark to a desired location in the 3-D game space. How to set a mark in a 3-D game space is not particularly disclosed in background art.

SUMMARY OF THE INVENTION

Therefore, an object of the present invention is to a novel game system and a novel game program enabling easier 3-D game play.

Another object of the present invention is to provide a novel game system and a novel game program capable of designating a location in a 3-D game space by using a 2-D map.

A still further object of the present invention is to provide a novel game system and a novel game program enabling a plurality of players to play the same game closely in cooperation with each other.

The present invention has the following features to attain the object mentioned above.

A first aspect (claim 1) of the present invention is directed to a game system in which a 3-D game screen and a 2-D map screen are displayed. The game system includes a 2-D map screen display control section (CPU 401 for executing step S61 in the embodiments, for example; hereinafter only step numbers are referred to), a cursor operating section (cross button 4a), a first cursor movement control section (steps S62 through S65), a 3-D game screen display control section (CPU 301 for executing step S32; hereinafter only step numbers are referred to), and a second cursor movement control section (steps S41 through S44). Here, a 3-D game screen is a screen for displaying a state of a 3-D game space viewed from a predetermined viewpoint, and a 2-D map screen is a screen for displaying at least part of a 2-D field map representing a plan view of the 3-D game space viewed from top. The 2-D map screen display control section is to display a 2-D map screen including a first cursor. The first cursor is to indicate an arbitrary location on the 2-D field map. The cursor operating section is operated by a player. The first cursor movement control section moves the first cursor on the 2-D field map in accordance with an operation of the cursor operating section. The 3-D game screen display control section is to display the 3-D game screen including a second cursor. The second cursor is to indicate a specific location in the 3-D game space. The specific location corresponds to the location indicated by the first cursor on the 2-D field map. The second cursor movement control section moves the second cursor in the 3-D game space in relation to a movement of the first cursor on the 2-D field map.

According to the first aspect, it is possible to obtain a game system in which the second cursor can be moved in the 3-D game space in relation to the first cursor being moved on the 2-D field map. Therefore, by indicating a desired location on the easy-to-read 2-D field map with the first cursor, and the player can know a location in the 3-D game space corresponding to the desired location through the second cursor. In other words, it is possible to correctly indicate the desired location in the 3-D game space without being annoyed by the depth direction in the 3-D game space. For example, with the use of the second cursor, it is possible to move a player object appearing in the 3-D game screen to a desired location therein without losing a sense of direction. This enables easier 3-D game play.

Also, preferably (claim 2), the game system further includes a hint data storage section (DVD-ROM 32 or working memory 402), a location designating section (A button 4d and steps S62 through S65), and a hint display control section (steps S75 through S78). The hint data storage section stores hint data. The hint data serves as a hint for proceeding a game in the 3-D game space. This hint data is related to a location on the 2-D field map. The location designating section is operated by the player to designate a desired location on the 2-D field map by using the first cursor. The hint display control section reads hint data related to the location designated by the location designating section from the hint data storage section, and displays a hint based on the hint data.

Thus, when a desired location is designated on the 2-D field map, a hint at that location is displayed. Therefore, it is possible to obtain a game system that enables the player to easily win a 3-D game.

Furthermore, more preferably (claim 3), when no hint data related to the location designated by the location designating section is found, the hint display control section displays a hint based on hint data related to a location within a predetermined range from the designated location. Still more preferably, the hint data is displayed on the 2-D map screen.

Still further, preferably (claim 4), the game system further includes a command display control section (step S69), a command display control section (B button 4e and step S68), and a specific phenomenon causing section (step S48). The command display control section makes a specific phenomenon command displayed on the 2-D map screen. The specific phenomenon command causes a specific phenomenon to occur in the 3-D game space. More specifically, the specific phenomenon represents a change in image on the 3-D game screen such as an animated image of an explosion, and a change in the entire image associated with a rotation of a virtual camera. The command selecting section is operated by the player for selecting a specific phenomenon command (item or icon) displayed on the 2-D map screen. The specific phenomenon causing section causes the specific phenomenon corresponding to the specific phenomenon command selected by the command selecting section to occur at a location the second cursor in the 3-D game space.

Thus, it is possible to obtain a game system that can exactly cause a desired phenomenon at a location desired by the player in the 3-D game space. Furthermore, if two players uses this game system, they try to clear the game in cooperation with each other in the same game space. Therefore, game play becomes much more fun.

Still further, as the specific phenomenon, an explosion may be occurred at the location indicated by the second cursor (claim 5). Still further, as the specific phenomenon, a line of vision from the viewpoint may be turned to a direction of the second cursor (claim 6). Still further, as the specific phenomenon, a player character operable by the player may be turned to a direction of the second cursor (claim 7).

Still further, preferably (claim 8), the game system further includes a first display section (home television 2) and a second display section (liquid crystal monitor 41). The first display section and the second display section are structured separately from each other. The first display section displays the 3-D game screen, and the second display section displays the 2-D map screen.

With this, the 3-D game screen and the 2-D map screen are displayed separately on different display sections. Therefore, it is possible to obtain a game system in which the 3-D game space and the 2-D field map are displayed in detail on the respective display sections. With these screens displayed on different display sections, if two players play a game, for example, a first player plays the game through the 3-D game screen, while a second player plays the game through 2-D map screen to help the first player win the game. This makes it possible to provide a novel game system.

Still further, preferably (claim 9), the game system further includes a player character operating section (main stick 31a) and a player character action control section (steps S33 through 38). The player character operating section is operated by the player for operating a player character appearing in the 3-D game space. The player character action control section controls an action (including movement and motion) of the player character in the 3-D game space in accordance with an operation of the player character operating section. Here, the cursor operating section and the player character operating section are separately provided on different controllers so as to be operable by different players.

Thus, a first player operates the player character and the second player operates the cursor. This makes it possible to provide a novel game system in which players play the same game closely in cooperation with each other.

A second aspect (claim 10) of the present invention is directed to a game system having a video game machine that makes a 3-D game space displayed on a home television receiver and a hand-held game machine communicably connected to the video game machine. The hand-held game machine includes a 2-D map image display control section, a cursor operating section, and a transmitting section (step S63). The 2-D map image display control section makes a display device incorporated in the hand-held game machine display at least part of a 2-D field map representing a plan view of the 3-D game space viewed from top and having a first cursor superposed thereon for indicating an arbitrary location on the 2-D field map. The cursor operating section is operated by a player for moving the first cursor. The transmitting section transmits operation information indicating an operation of the cursor operating section to the video game machine. The video game machine includes a 3-D game screen display section, a receiving section (step S41), and a second cursor movement control section. The 3-D game screen display section makes the home television receiver display the a state of 3-D game space viewed from a predetermined viewpoint and a second cursor for indicating a location in the 3-D game space corresponding to the location indicated by the first cursor on the 2-D field map. The receiving section receives the operation information from the hand-held game machine. The second cursor movement control section moves, based on the operation information received by the receiving section, the second cursor in the 3-D game space. With this, a movement of the second cursor in the 3-D game space is related to a movement of the first cursor on the 2-D field map.

With this, it is possible to obtain a game system in which the second cursor can be moved in the 3-D game space in relation to the first cursor being moved on the 2-D field map. That is, by indicating a desired location on the easy-to-read 2-D field map with the first cursor, and the player can know a location in the 3-D game space corresponding to the desired location through the second cursor. In other words, it is possible to correctly indicate the desired location in the 3-D game space without being annoyed by the depth direction in the 3-D game space. For example, with the use of the second cursor, it is possible to move a player object appearing in the 3-D game screen to a desired location therein without losing a sense of direction. This enables easier 3-D game play. Also, the video game machine and the hand-held game machine are linked together. Thus, it is possible to provide a cooperative game in which a first player operating the video game machine and a second player operating the hand-held game machine cooperate with each other to win a single game.

Furthermore, preferably (claim 11), the hand-held game machine further includes a hint data storage section, a location designating section, and a hint display control section. The hint data storage section stores hint data serving as a hint for proceeding a game provided in the 3-D game space, the hint data being related to a plurality of locations on the 2-D field map. The location designating section is operated by the player for designating a desired location on the 2-D field map by using the first cursor. The hint display control section reads hint data related to the location designated by the location designating section from the hint data storage section, and displaying a hint based on the hint data.

Still further, more preferably (claim 12), when no hint data related to the location designated by the location designating section is found, the hint display control section displays, on the 2-D map screen, a hint based on hint data related to a location within a predetermined range from the designated location.

Still further, preferably (claim 13), the hand-held game machine further includes a command display control section and a command selecting section, and the video game machine further includes a specific phenomenon causing section. The command display control section makes a specific phenomenon command displayed on the 2-D map screen, the specific phenomenon command for causing a specific phenomenon to occur in the 3-D game space. The command selecting section is operated by the player for selecting the displayed specific phenomenon command. At this time, a command corresponding to the specific phenomenon-command is sent from the hand-held game machine to the video game machine. The specific phenomenon causing section for causing the specific phenomenon corresponding to the specific phenomenon command selected by the command selecting section to occur at a location of the second cursor in the 3-D game space.

A third aspect (claim 14) of the present invention is directed to a recording medium having a game program recorded thereon, the game program executable by a computer of a game system in which a 3-D game screen for displaying a 3-D game space viewed from a predetermined viewpoint and a 2-D map screen for displaying at least part of a 2-D field map representing a plan view of the 3-D game space viewed from top are displayed. The game program causes the computer to execute the following steps: a first step (S61) of displaying, on the 2-D map screen a first cursor for indicating an arbitrary location on the 2-D field map; a second step (steps 62 through 65) of moving the first cursor on the 2-D field map in accordance with an operation by a player; a third step (step S32) of displaying, on the 3-D game screen, a second cursor for indicating a location in the 3-D game space corresponding to a location indicated by the first cursor on the 2-D field map; and a fourth step (steps S41 through S44) of moving the second cursor in the 3-D game space in relation to a movement of the first cursor on the 2-D field map. Thus, it is possible to obtain the same effects as those in the first or second aspect.

Furthermore, preferably (claim 15), the game-program includes hint data serving as a hint for proceeding a game provided in the 3-D game space, the hint data being related to a plurality of locations on the 2-D field map, and the game program further causes the computer to execute a step (steps S62 through S65) of causing the player to designate a desired location on the 2-D field map by using the first cursor; and a step (steps S75 through S78) of displaying a hint based on hint data related to the designated location.

Still further, more preferably (claim 16), in the hint displaying step, when no hint data related to the location designated by the first cursor is found, a hint based on hint data related to a location within a predetermined range from the designated location is displayed.

Still further, preferably (claim 17), the game program further causes the computer to execute a step (step S69) of displaying, on the 2-D map screen, a specific phenomenon command for causing a specific phenomenon to occur in the 3-D game space; and a step (S48) of causing the specific phenomenon corresponding to the specific phenomenon command when selected by the player to occur at a location of the second cursor in 3-D game space.

Still further, preferably (claim 21), the game system includes a video game machine and a hand-held game machine. The video game machine makes the 3-D game space displayed on a home television receiver. The hand-held game machine is communicably connected to the video game machine. The game program is executed by a computer of the video game machine and a computer of the hand-held game machine to make the 3-D game screen displayed on the home television receiver and to make the 2-D map screen displayed on a display device incorporated in the hand-held game machine.

Still further, preferably (claim 22), the game program further causes the computer to execute a step (steps S35 through S38) of controlling an action of a player character appearing in the 3-D game space. Here, in the first cursor moving step and the player character action controlling step, operation instructions from different controllers are accepted so as to allow operations, by different players.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 is an external view of a game system according to a second embodiment of the present invention;

DESCRIPTION OF THE PREFERRED EMBODIMENTS

With reference to the drawings, described below are embodiments of the present invention.

Figure 1:
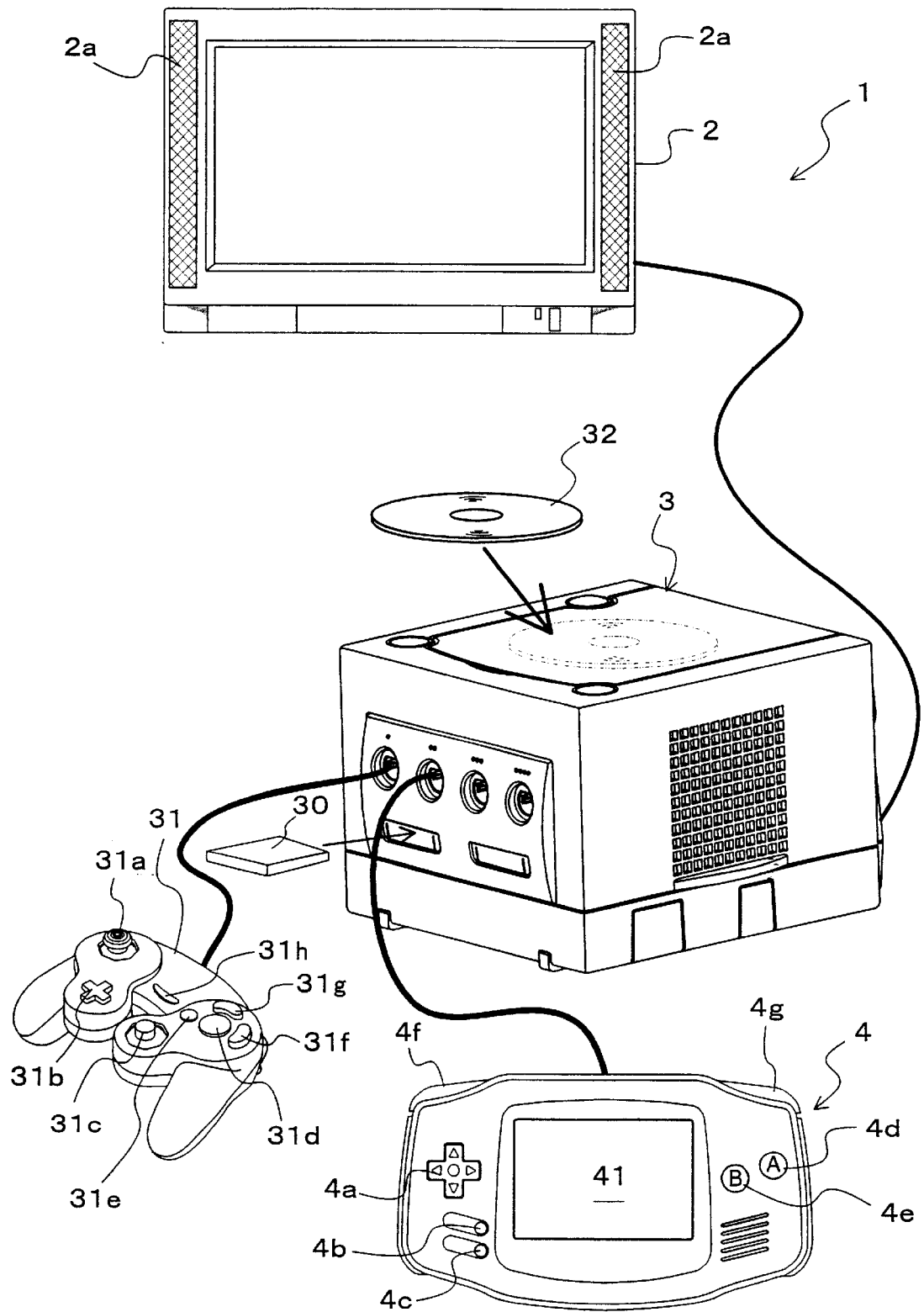
FIG. 1 is an external view of a game system according to one embodiment of the present invention.

FIG. 1 is an external view of a game system according to a first embodiment of the present invention. As illustrated in FIG. 1, a game system 1 is configured by a video game machine 3 connected to a home television receiver (hereinafter simply referred to as "television") 2, and a hand-held game machine 4 communicably connected to the video game machine 3. The video game machine 3 includes a controller 31, and a DVD-ROM 32, which is merely an example of an information storage medium. Furthermore, to the video game machine 3, a memory card 30 incorporating a flash memory fixedly storing save data, etc., is removably inserted as required. Here, the game system 1 makes the television 2-Display the state of 3-D virtual game space viewed from a predetermined viewpoint as a 3-D game screen, and also makes the hand-held game machine 4 display a 2-D field map, which is a plane map representing the game space viewed from top, as a 2-D map screen. Note that, as will be described later, the 2-D map screen according to the present embodiment has a first cursor displayed thereon, and the 3-D game screen has a second cursor displayed thereon.

A controller 31 is removably connected to the video game machine 3. The controller 31 is an operation section for operating a player object (game character to be operated by a player) appearing in the 3-D game space displayed mainly on the television 2, and has a plurality of operation buttons. Specifically, the controller 31 has grip portions held by the user with his or her hands; a main stick 31a and a cross button 31b that are operable by a thumb of a left hand; and a C stick 31c, an A button 31d, a B button 31e, an X button 31f, a Y button 31g, and a start button 31h that are operable by a thumb of a right hand. Furthermore, although not shown, the controller 31 includes analog trigger buttons operable by index fingers of both hands, and the like. For example, the main stick 31a is used for moving the player object in a desired direction in the 3-D game space. The C stick 31b is used for moving a virtual camera (viewpoint) in 3-D game space. The A button 31d is used for designating an action of the player object.

The hand-held game machine 4 in the game system 1 is used mainly as a controller for the video game machine 3 for operating the first cursor that indicates an arbitrary location on the 2-D field map displayed on the hand-held game machine 4. This hand-held game machine 4 includes a liquid crystal monitor 41, which is a display section, and a plurality of operation buttons operable by the player. The operation buttons include a cross button 4a, a start button 4b, and a select button 4c that are provided on the surface of the liquid crystal monitor 41 on the left; an A button 4d and a B button 4e that are provided on the surface thereof on the right; an L button 4f provided on the left shoulder thereof; and an R button 4g provided on the right shoulder thereof. For example, the cross button 4a is used for moving the first cursor on the field map, and the A button is used for determining the location of the first cursor. The hand-held game machine 4 transmits coordinates of the first cursor on the field map to the video game machine 3 as coordinates of the second cursor in the 3-D game space. Also, the hand-held game machine 4 receives coordinates of the player object or enemy objects from the video game machine 3, and carries out processing, such as moving a mark corresponding to the object on the field map.

Figure 2:
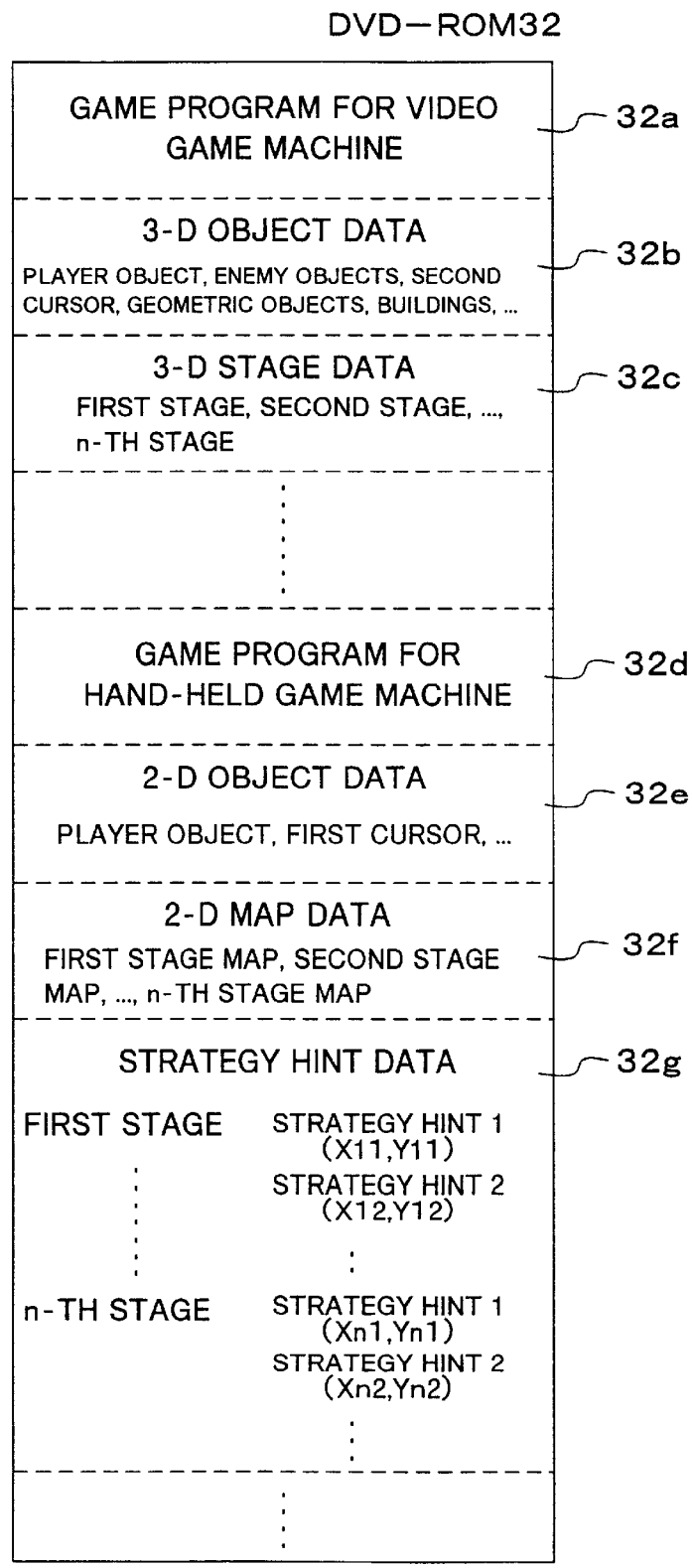
FIG. 2 is an illustration showing one example of programs and data stored in a DVD-ROM.

The DVD-ROM 32 to be inserted in the video game machine 3 is a recording medium that stores game programs to be executed by computers of the video game machine 3 and the hand-held game machine 4. Specifically, as illustrated in FIG. 2, the DVD-ROM 32 stores a game program 32a to be executed by the computer of the video game machine 3, and 3-D object data 32b, 3-D stage data 32c, etc. that are used by the game program 32a. Furthermore, the DVD-ROM 32 stores a game program 32d to be executed by the computer of the hand-held game machine 4, and 2-D map data 32f, strategy hint data (hint data) 32g for stages of a game, etc. that are used by the game program 32d. The 3-D object data 32b includes data concerning a player object, enemy objects, geometric objects, structure objects, 3-D objects such as the second cursor. The 3-D stage data 32c is data for forming a game space for each stage, such as arranging geometry, building, etc. The 2-D object data 32e is data for displaying the player object and the first cursor as 2-D images. The 2-D map data 32f includes data of 2-D field maps for the respective stages. The hint data 32g includes hint data related to coordinates of a certain location on the 2-D field map for each stage. Note that, of 3-D coordinates (X, Y, Z) in the 3-D game space, components in a plane coordinate system (X, Y) correspond to 2-D coordinates (x, y) on the 2-D field map. In other words, when a certain location on the field map is designated, coordinates of the designated location (x, y) determine the plane coordinate components (X, Y) of the three-dimensional coordinates (X, Y, Z) in the 3-D game space.

Figure 3:
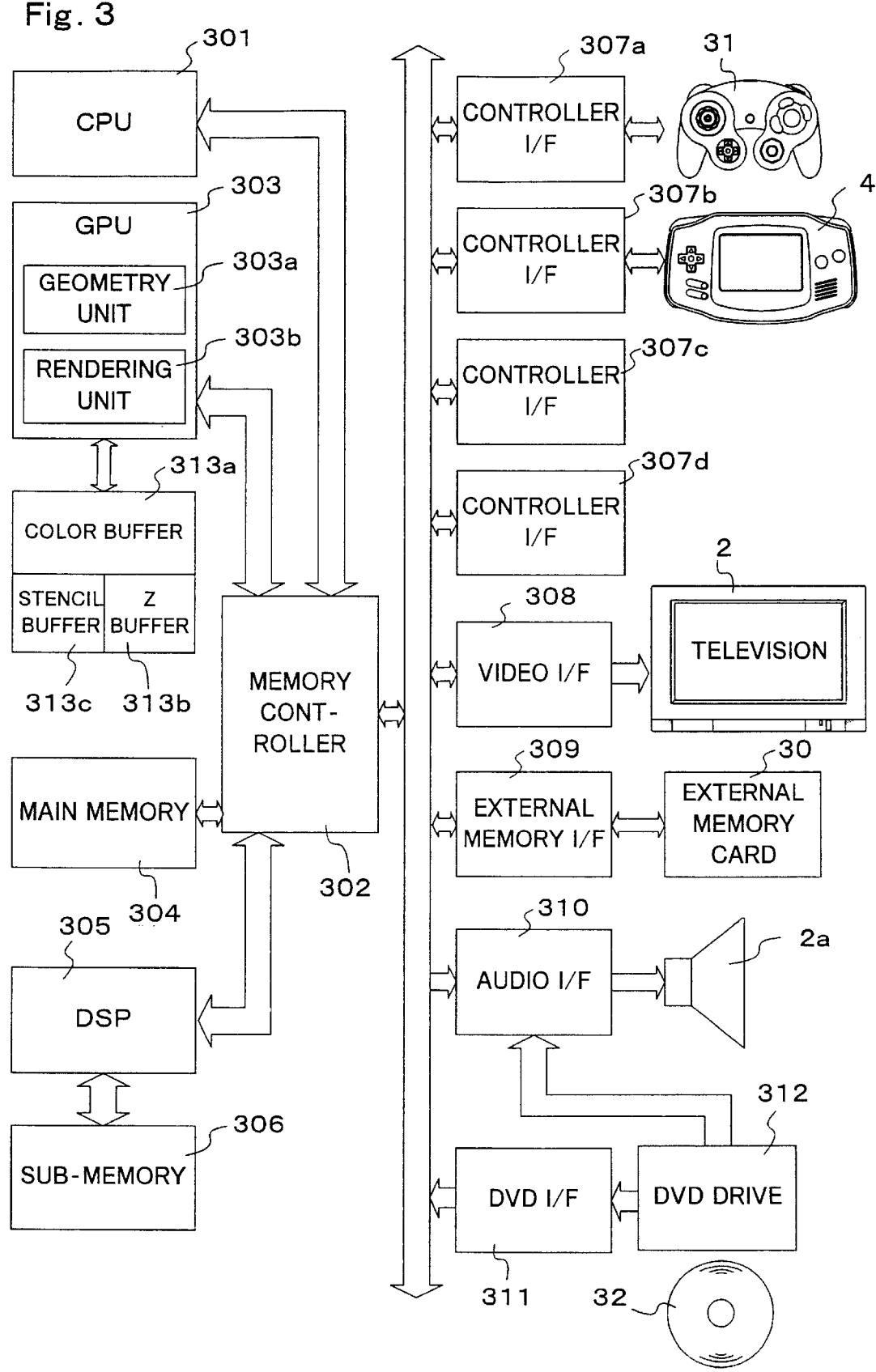
FIG. 3 is a block diagram illustrating the construction of one example of a video game machine.
Figure 13:
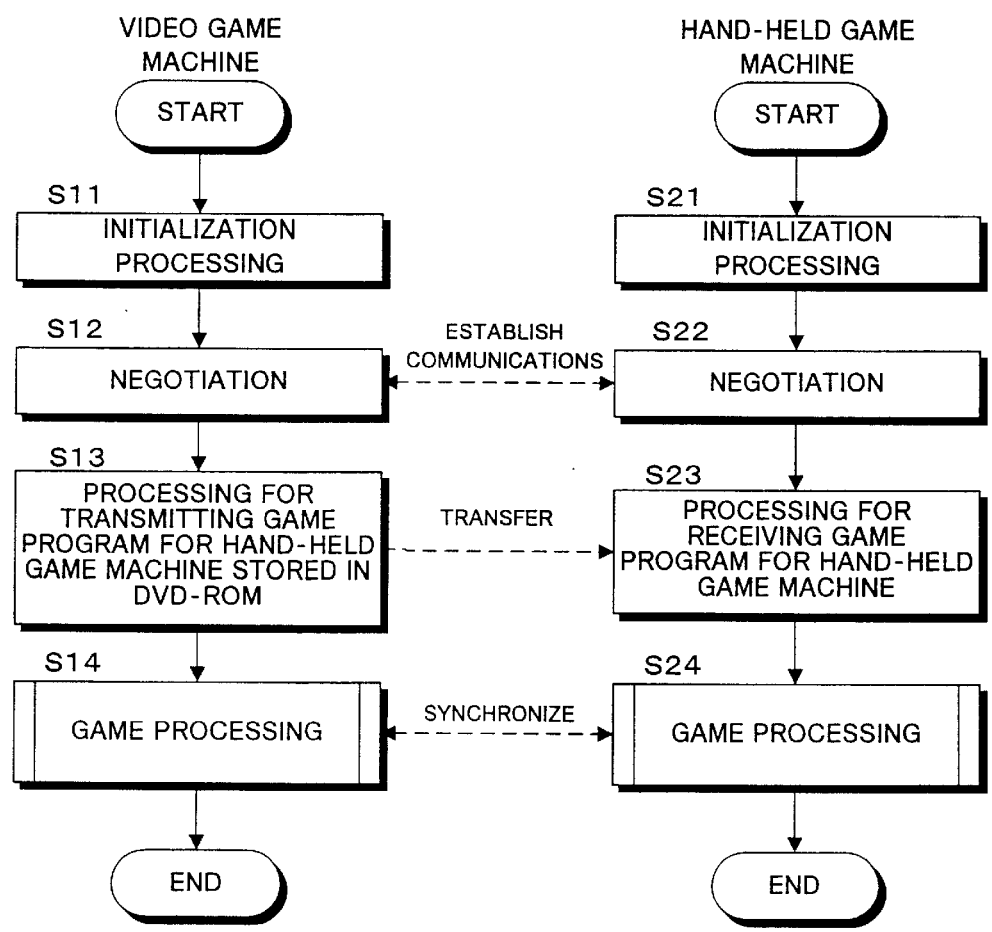
FIG. 13 is a flowchart of a procedure to be followed in the game system.
Figure 14:
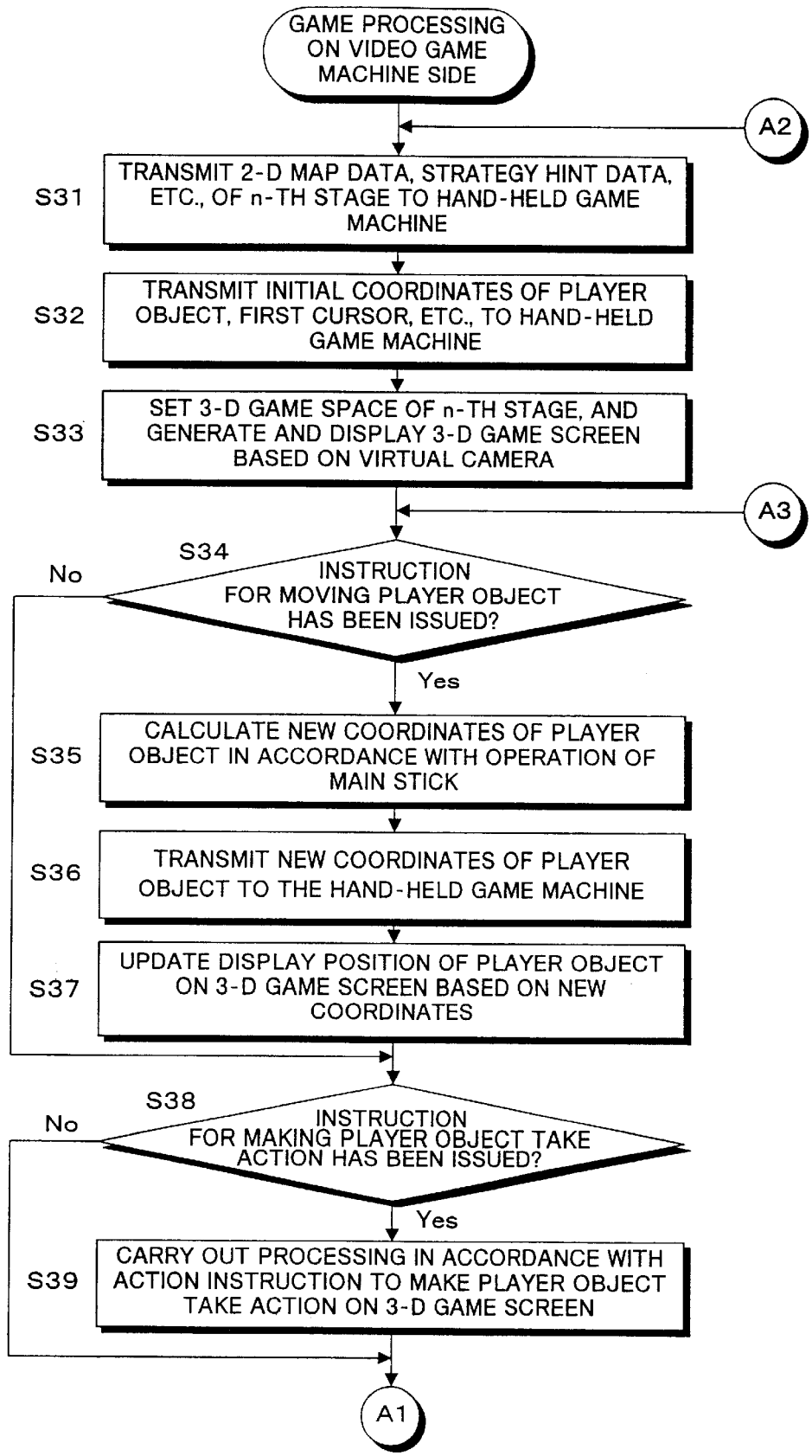
FIG. 14 is the first-half of a flowchart of a procedure to be followed by the video game machine.
Figure 15:
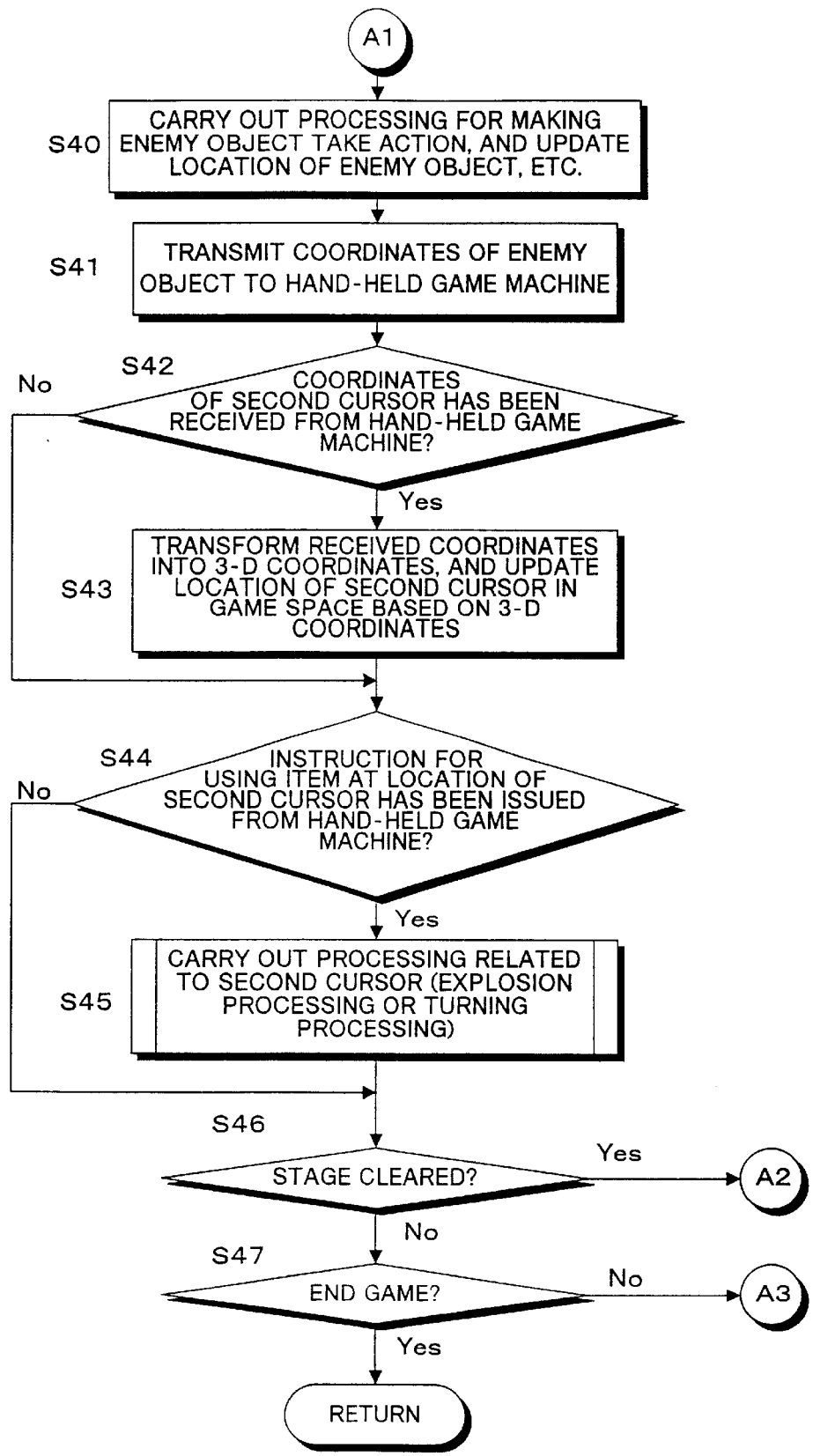
FIG. 15 is the latter-half of the flowchart of the procedure to be followed by the video game machine.

FIG. 3 is a block diagram illustrating the construction of the video game machine 3. As illustrated in FIG. 3, the video game machine 3 includes a CPU (Central Processing Unit) 301 for executing various programs. The CPU 301 executes a boot program stored in a boot ROM (not shown) to initialize memories and the like, and then executes the game program stored in the DVD-ROM 32 and game processing according to the game program (will be described later with reference to FIGS. 13 through 15). The CPU 301 is connected to a memory controller 302.

The memory controller 302 has control over data transfer, connecting to a GPU (Graphics Processing Unit) 303, a main memory 304, a DSP (Digital Signal Processor) 305, and various I/Fs (interfaces) 307 through 311.

The GPU 303 carries out image processing based on an instruction from the CPU 301, connecting to a memory 313-Dedicated to image processing. This image-processing-dedicated memory 313 is used as, for example, a color buffer 313a, a Z buffer 313b, and a stencil buffer 313c. The color buffer 313a is a storage area allocated for storing image data for one frame to be displayed on a screen of a display unit, storing game image data (RGB data) generated by a rendering unit 303b (will be described later). The Z buffer 313b is a storage area allocated for holding depth information (Z value) obtained from a viewpoint which is lost when 3-D viewpoint coordinates are transformed into 2-D screen coordinates. The stencil buffer 313c is a storage area allocated to be used as a counter when shading is performed, for example. Note that the above-described video game machine 3 has the hardware structure provided with the image-processing-dedicated memory 313, but may have UMA (Unified Memory Architecture), wherein part of the main memory 304 is used as an image-processing-dedicated memory.

The GPU 303 includes a geometry unit 303a and the rendering unit 303b. The geometry unit 303a carries out processing for calculating coordinates of a 3-D model (object composed by polygons, for example) related to substances and graphics placed in a 3-D virtual game space. Example of such processing are rotation, zoom-in/zoom-out, transformation of the 3-D model, and transformation of coordinates in a world coordinate system into those in a viewpoint coordinate system or in a screen coordinate system. The rendering unit 303b is to generate game images by writing color data (RGB data) of the 3-D model projected onto screen coordinates in the color buffer 313a for each pixel based on predetermined texture. The GPU 303 uses the geometry unit 303a and the rendering unit 303b to generate game image data to be displayed on the television 2, and outputs, when appropriate, the generated game image data to the television 2 through the controller 302 and the video I/F 308.

The main memory 304 is a storage section to be used by the CPU 301, storing the game program. For example, the main memory 304 stores the game program 32a and various data read by the CPU 301 from the DVD-ROM 32. These game program 32a and various data stored in the main memory 304 are executed by the CPU 301.

The DSP 305 processes sound data and other data generated by the CPU 301 at the time of executing the game program, and connects to a sub-memory 306 for storing the sound data and other data. The sub-memory 306 is used when the DSP 305 carries out predetermined processing (for example, storing the game program or sound data previously read). The DSP 305 outputs the sound data stored in the sub-memory 306 to a loudspeaker 2a incorporated in the television 2 through the memory controller 303 and the audio I/F 310.

The memory controller 302 is connected to various I/Fs, such as a controller I/F 307, a video I/F 308, an external memory I/F 309, an audio I/F 310, and a DVD I/F 311. The controller I/F 307 is structured by, for example, four controller I/Fs 307a through 307d, with the controller I/F 307a connecting to the controller 31 and the controller I/F 307b communicably connecting to the hand-held game machine 4. The controller I/F 307 interfaces between a device(s) connected thereto (here, the controller 31 and the hand-held game machine 4) and the CPU 301. The video I/F 308 connects to the television 2. The external memory I/F 309 connects to the memory card 30. The audio I/F 310 connects to the loudspeaker 2a incorporated in the television 2 for producing sound data coming directly from the DVD drive 312 through the loudspeaker 2a. The DVD I/F 311 connects to the DVD drive 312.

Figure 4:
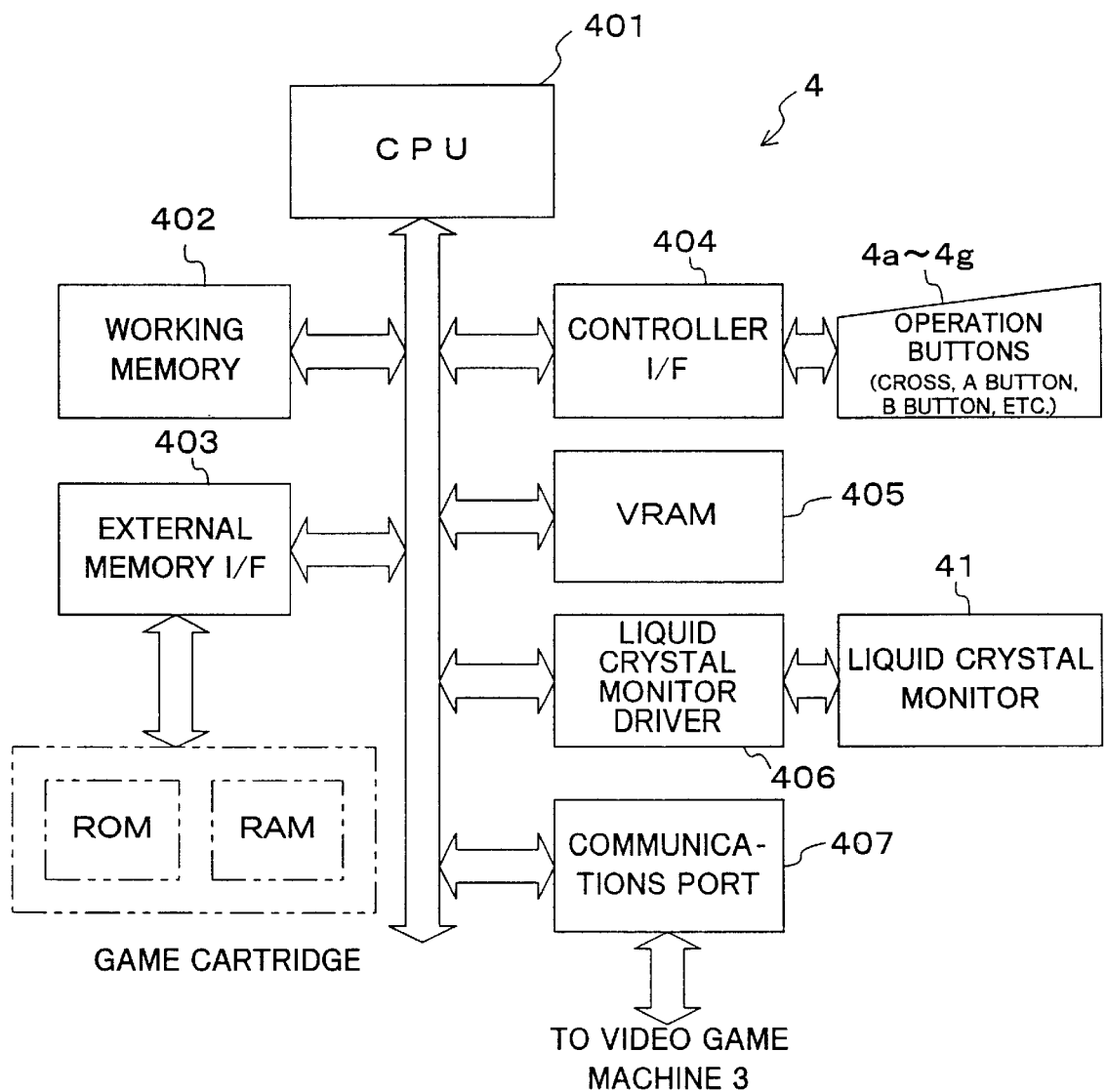
FIG. 4 is a block diagram illustrating the construction of one example of a hand-held game machine.

FIG. 4 is a block diagram illustrating the construction of the hand-held game machine 4. As illustrated in FIG. 4, the hand-held game machine 4 includes a CPU 401 for executing the game program for the hand-held game machine. The CPU 401 is connected to a working memory 402, an external memory I/F 403, a controller I/F 404, a VRAM 405, a liquid crystal monitor driver 406, and a communications port 407. The controller I/f 404 connects to the plurality of operation buttons 4a through 4g. The liquid crystal monitor driver 406 connects to the liquid crystal monitor 41. Furthermore, the external memory I/F 403 connects to a game cartridge as required. The game cartridge includes ROM storing the game program, and RAM for backing up game data. The communications port 407 is communicably connected to the video game machine 3.

When the hand-held game machine 4 is powered ON, the CPU 401 executes a boot program stored in the boot ROM (not shown) to initialize the memories and the like, and then obtains data that has been sent to the communications port 407. At this time, the game program 32d for the hand-held game machine has been sent from the video game machine 3 through a communications cable, and therefore the game program has already been stored in the working memory 402. Then, the CPU 401 executes the game program 32d stored in the working memory 402 to start game processing (will be described later with reference to FIGS. 13, and 16 through 18).

Described below are specific processing performed by the computer of the video game machine 3 and specific processing performed by the computer of the hand-held game machine 4 in the game system. Prior to that, to facilitate understanding of the present invention, the outline of processing and a game performed in the game system 1 is described first.

First, in the game system 1 of the present embodiment, a 3-D game screen representing a 3-D game space is displayed on the television 2, while a 2-D field map is displayed on the liquid crystal monitor 41 of the hand-held game machine 4. This game system 1 can be used by a single player, but more preferably, by two players in cooperation with each other to win a game. For example, a first player uses the video game machine 3 to operate the player object while watching the 3-D game screen displayed on the television 2, and a second player uses the hand-held game machine 4 to operate the first cursor while watching the 2-D map screen displayed on the liquid crystal monitor 41. At this time, the movement of the first cursor is reflected on the second cursor. Therefore, it is possible to accurately grasp the position of the second cursor in the 3-D game space on the 3-D game screen. That is, for example, the first player can move the player object with reference to the second cursor. With this, two players can cooperate with each other to proceed the game.

Figure 8A:
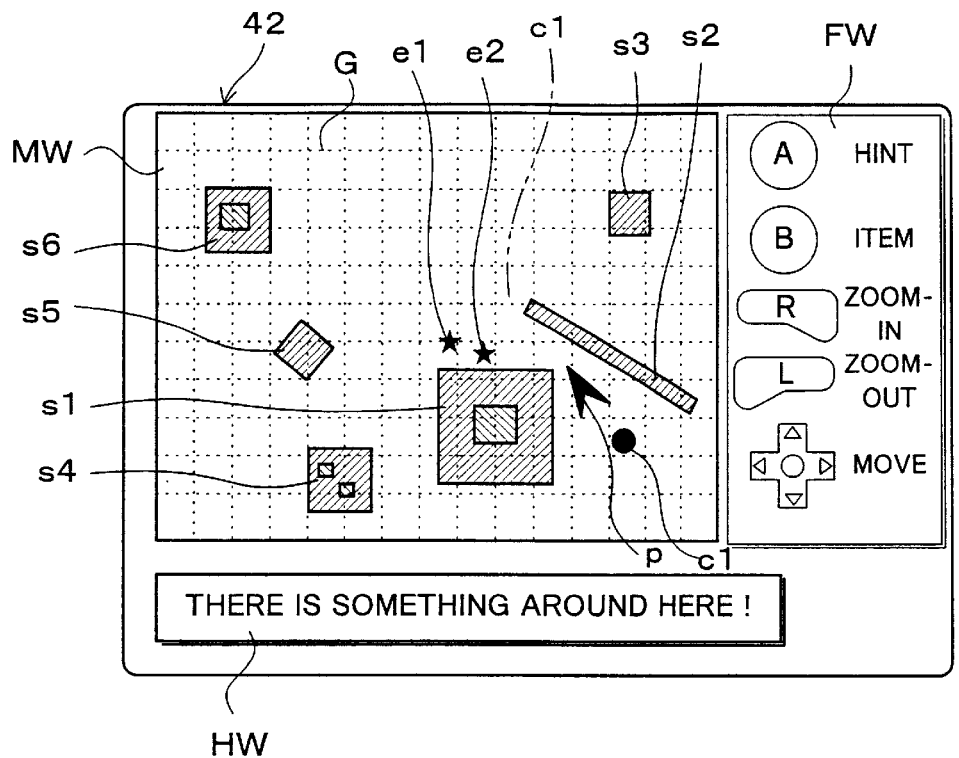
FIG. 8A and FIG. 8B are illustrations showing examples of a 2-D map screen.
Figure 8B:
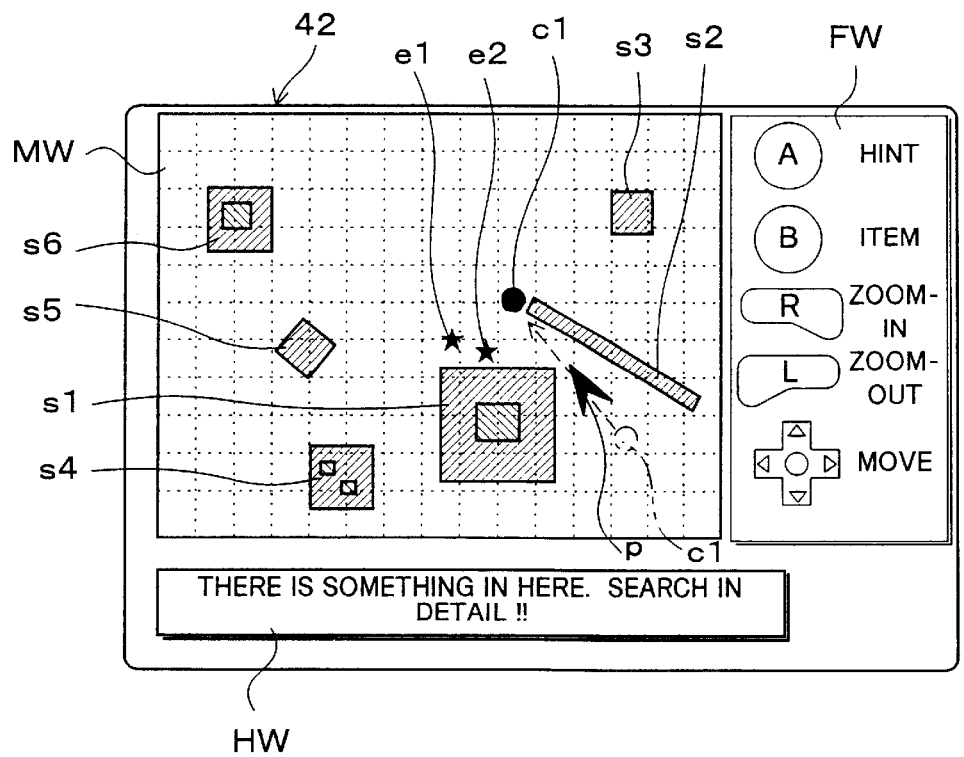
Figure 9:
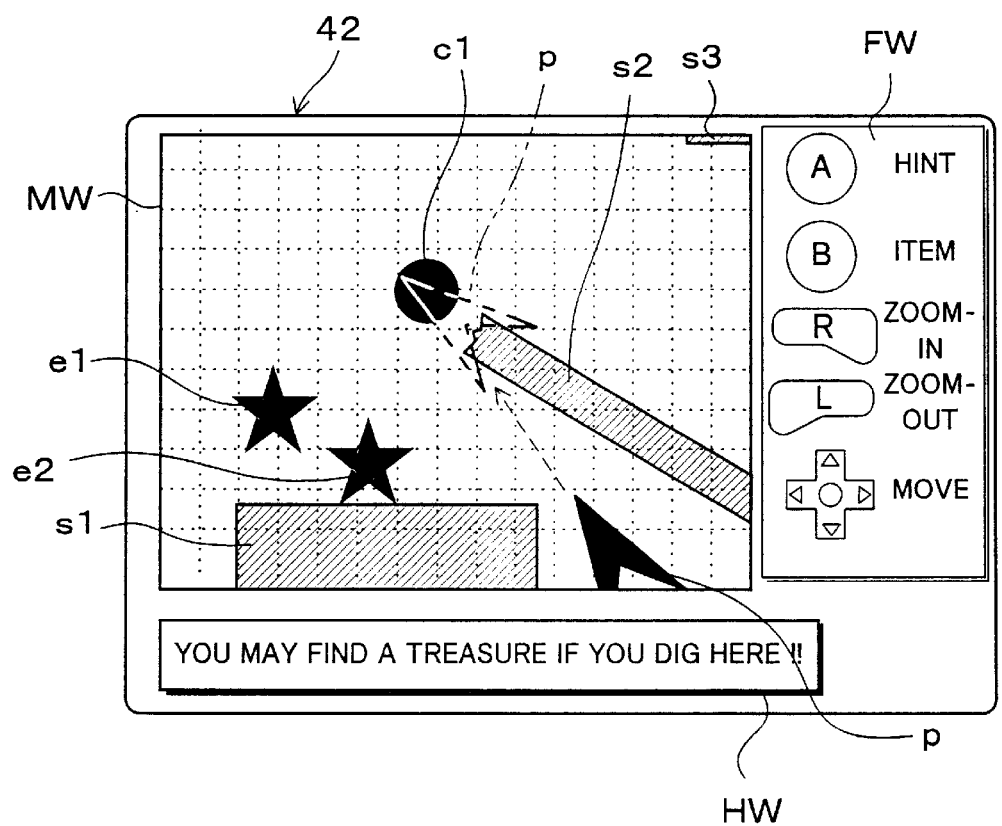
FIG. 9 is an illustration showing a zoomed-in field map on the 2-D map screen.

Also, especially in the present embodiment, a hint to win the game is displayed on the hand-held game machine 4 at a location designated by the first cursor on the field map (refer to FIGS. 8A, 8B, and 9). The hint indicates, for example, a tip on how to win the game, such as how to solve a riddle, which has been conventionally provided by paper media such as how-to books. With this hint, the first and second players can know, in the course of game play, how to solve a problem related to a desired location on the 2-D field map. Note that the hint is not displayed on the 3-D game screen having the player object being displayed thereon (that is, the screen mainly used for game play), and therefore does not obstruct the progress of the game. The hint is told by the second player to the first player, and the location in the game space related to the hint becomes evident from the second cursor (refer to FIG. 6). Then, the first player refers to the second cursor to move the player object, thereby successfully reaching the location (refer to FIG. 10).

Figure 11A:
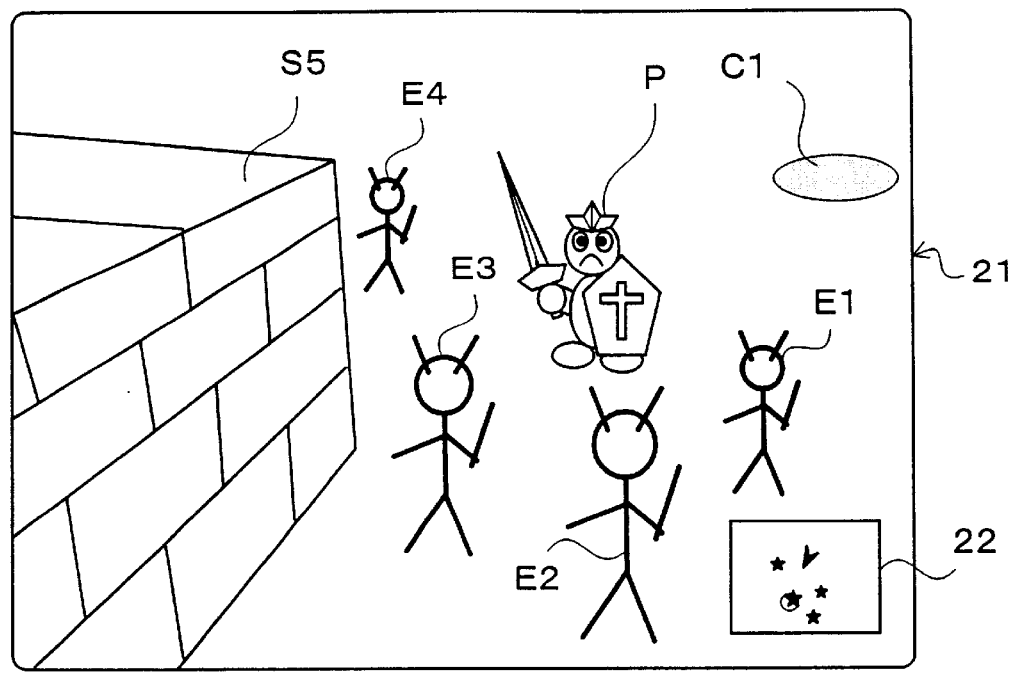
FIG. 11A and FIG. 11B are illustrations showing a state where the player object is surrounded by a plurality of enemy objects.
Figure 11B:
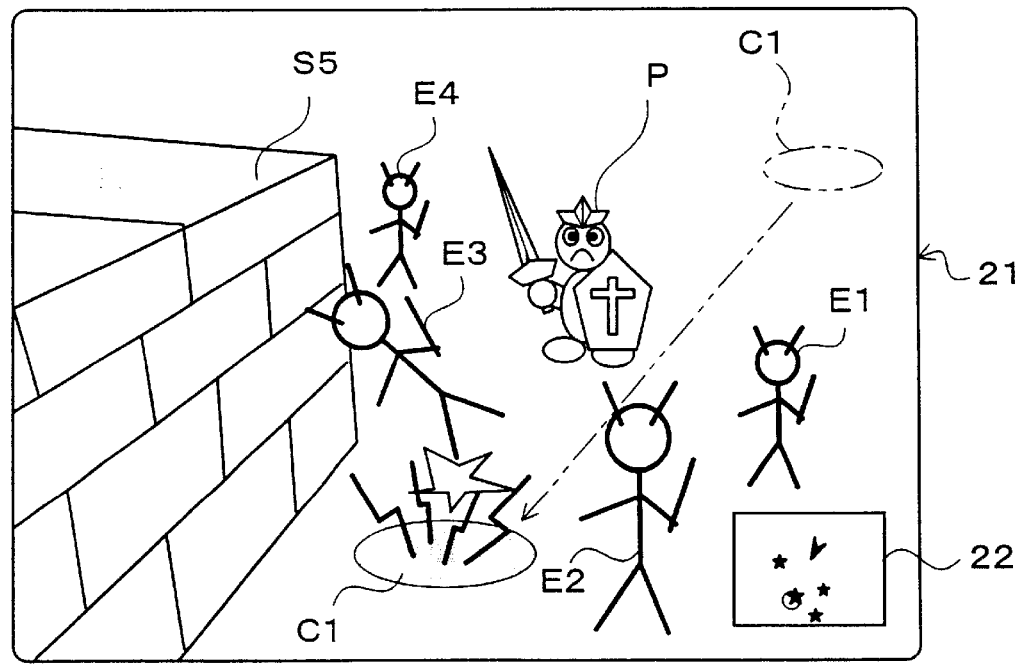

Furthermore, in the present embodiment, the hand-held game machine 4 designates a specific phenomenon (refer to FIG. 12A) to occur at the location of the second cursor in the game space (refer to FIG. 11B). The specific phenomenon is a phenomenon that affects the player object and/or enemy objects, such as an explosion in the game space and a call to the player object. Specifically, when the hand-held game machine 4 designates an explosion to occur at the location of the second cursor, or designates a call for the player object to turn the player object in the game space to the direction of the second cursor or to turn the virtual camera to the location of the second cursor. Such designation of a specific phenomenon enables two players to be more cooperative.

With reference to FIGS. 5 through 12, the present embodiment is now described more specifically.

Figure 5:
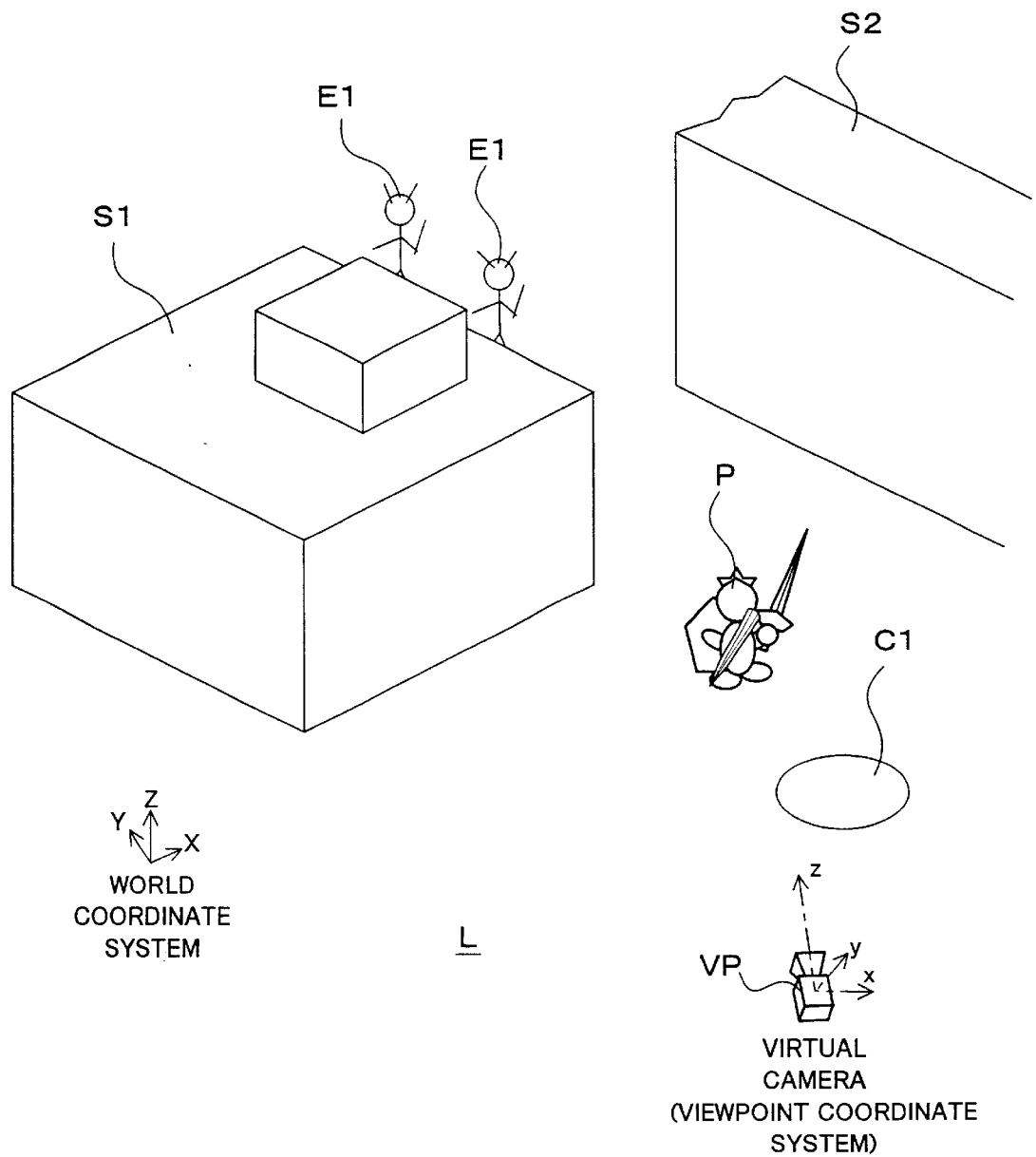
FIG. 5 is an illustration showing one example of a 3-D game space.

FIG. 5 is an illustration showing one example of a 3-D game space. The 3-D game space (hereinafter simply referred to as "game space") is in the 3-D coordinate system (world coordinate system), and is virtually formed (which is meant not to be appeared on a screen or the like) by the game program 32a being executed by the video game machine 3. In the game space, a plurality of objects formed in advance by polygons defined by 3-D coordinates are arranged. Examples of such objects are a ground object L (only a reference character is shown in FIG. 5), a player object P, an enemy object E1, an enemy object E2, a structure object S1, a structure object S2, and a second cursor object C1. Furthermore, in the game space, structure objects S3 through S6 are arranged, which are not shown in FIG. 5. The ground object L is an object that constitutes ground in the game space. The player object P is an object operable by the player. The enemy objects E1 and E2 are objects operated by a predetermined program, attacking the player object, for example. The structure objects S1 and S2 are objects that represent a building, a wall, and others in the game space. Also placed in the game space is a virtual camera VP representing a predetermined viewpoint. As has been described for the GPU 3, the video game machine 3 generates a 2-D game image based on the virtual camera VP, and makes the image displayed on the television 2. A screen displayed on the television is called a 3-D game screen. As such, the virtual camera VP is used for displaying the 3-D game space as a game screen, and specifically, makes a 3-D game screen displayed as illustrated in FIG. 6.

Figure 6:
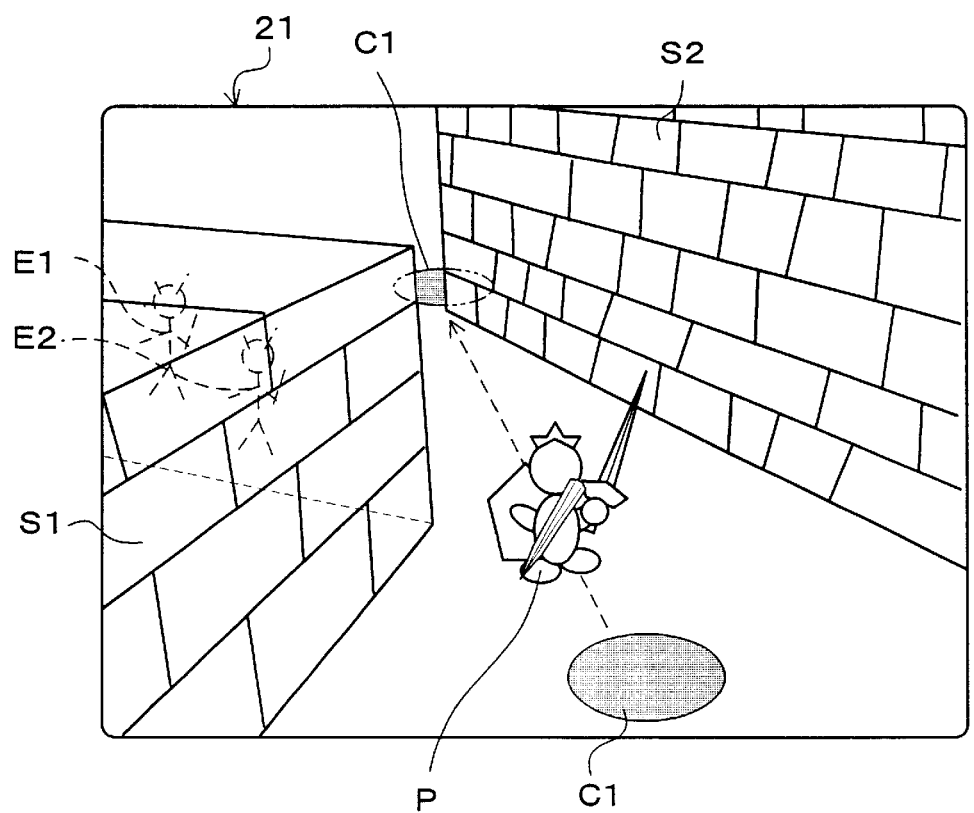
FIG. 6 is an illustration showing one example of a 3-D game screen.

FIG. 6 illustrates an example of the 3-D game screen displayed on the television 2. As illustrated in FIG. 6, displayed on a 3-D game screen 21 are objects colored with various texture, specifically, the player object P, the second cursor C1, and the structure objects S1 and S2. Here, the enemy objects E1 and E2 are hidden behind the structure object S1, and therefore are not displayed on the 3-D game screen 21. The second cursor C1 is displayed at a location behind the player object P. This second cursor C1 synchronizes with a first cursor c1, which will be described later, of the hand-held game machine 4, moving to an end of the structure object S2 (shown by a double-dotted circle), for example. Here, the objects displayed on the 3-D game screen 21 and objects displayed on a 2-D map screen 42, which will be described later, are similarly provided with reference characters to clarify the relationship between these objects. However, note that, to distinguish the difference therebetween, uppercase letters are used in the 3-D game screen 21, while lowercase letters are used in the 2-D map screen 42.

Figure 7:
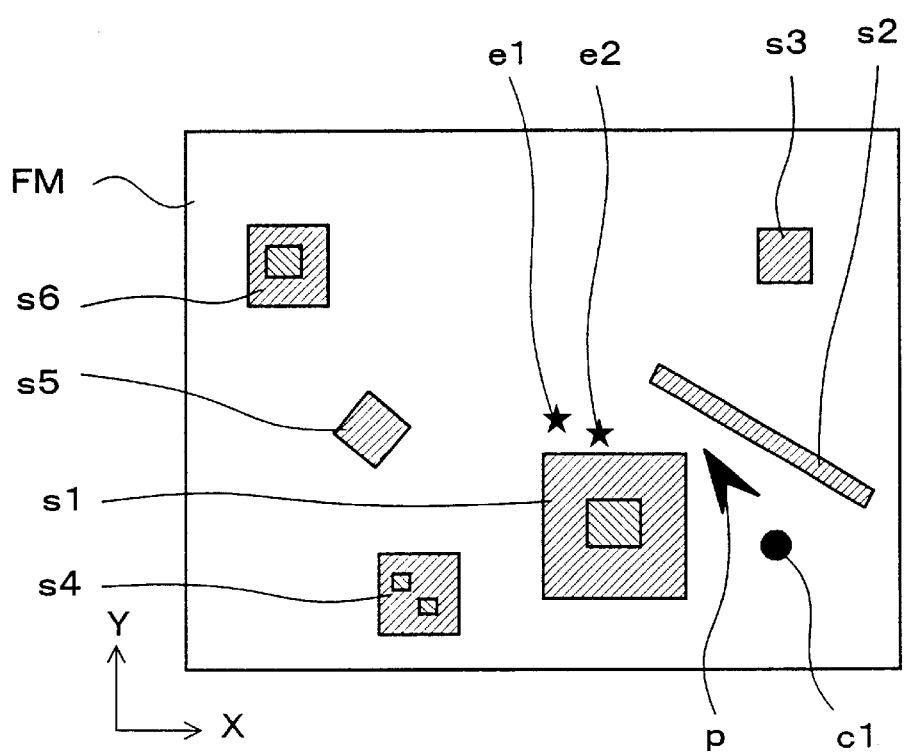
FIG. 7 is an illustration showing one example of a 2-D field map.

FIG. 7 is an illustration showing one example of the 2-D field map. A 2-D field map (hereinafter simply referred to as "field map") FM represents a plane view of the entire game space viewed from top, and is generated from the 2-D object data 32e and the 2-D map data 32f stored in the DVD-ROM 32. Also, this field map FM is related to the strategy hint data corresponding to coordinates of a plurality of locations. Displayed on the field map FM are a player object p represented by an image of an arrow, a first cursor c1 represented by an image of a circle, enemy characters e1 and e2 represented by images of stars, and a plurality of structure objects s1 through s6. Furthermore, coordinates (x, y) on the field map correspond to the plane coordinate components (X, Y) of the 3-D coordinate components (X, Y, Z) in the game space. That is, the first cursor c1 and the second cursor C2 move in synchronization with each other, so do the player object p and the player object P, the enemy objects e1 and E1, and the enemy objects e2 and E2. This field map FM is displayed, as exemplarily illustrated in FIG. 8A, on the hand-held game machine 4 as a 2-D map screen.

FIGS. 8A and 8B illustrate examples of the 2-D map screen displayed on the liquid crystal monitor 41 of the hand-held game machine 4, wherein a specific location on the field map is designated by the first cursor. An display area of the 2-D map screen 42 is broadly divided into a map window MW, a hint window HW, and a function window FM. Displayed on the map window MW is the field map FM including the player character p and others. Furthermore, the map window MW has a lattice grid G (represented by dotted lines in FIGS. 8A and 8B) superposed thereon for easy location designation. Displayed on the hind window HW is a strategy hint related to the location of the first cursor by a predetermined operation. Displayed on the function window FW are functions assigned on the operation buttons 4a through 4g of the hand-held game machine 4. For example, when the cross button 4a of the hand-held game machine 4 is pressed through the function window FW, the first cursor c1 is moved as illustrated in FIG. 8B (in a direction indicated by a dotted arrow). At this time, as illustrated in FIG. 6, the second cursor C1 is also moved accordingly on the 3-D game screen 21 (in a direction indicated by a broken line). Then, with an operation of the A button 4d, a strategy hint related to the location of the first cursor, "There is something in here! Search in detail!!", is displayed on the hint window HW. In response, the second player operates the R button 4g. With this, as illustrated in FIG. 9, a specific location on the field map is zoomed up for display.

FIG. 9 is an illustration showing the zoomed-up field map FM. As illustrated in FIG. 9, part of the field map FM approximately centering on the first cursor c1 is zoomed up for display on the map window MW. With such zoomed-up display, a location on the field map FM can be more precisely designated on the field map FM. At this time, when the A button 4d is operated, a strategy hint "You may get a treasure if you dig here!!" is displayed. This hint is told by the second player to the first player. In response, the first player operates the player object P, which is illustrated in FIG. 10.

Figure 10:
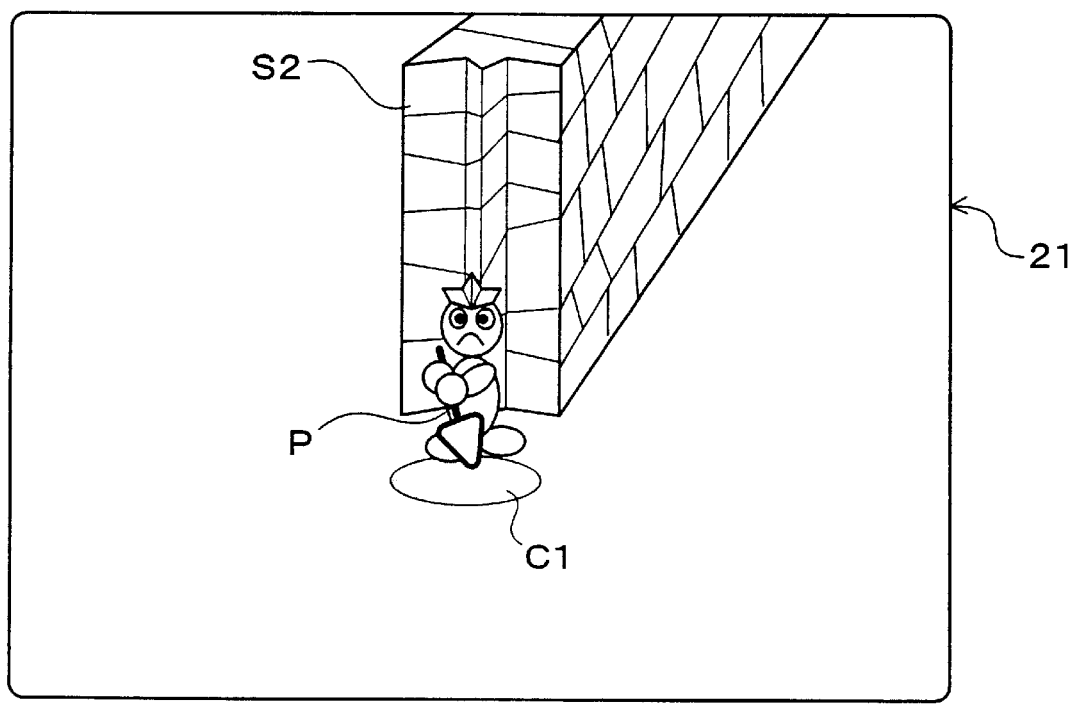
FIG. 10 is an illustration when a player object has been moved to a location of a second cursor.

FIG. 10 is an illustration of the player object at the location in the 3-D game space corresponding to the first cursor c1 of the field map FM. As illustrated in FIG. 10, the 3-D game screen 21 has the second cursor C1 and the player object P displayed thereon, the player object P having been moved to the location of the second cursor C1 by the operation of the first player based on the hint. On receiving an instruction from the second player by the second cursor C1, the first player makes the player object dig this place, thereby possibly finding a treasure, for example. As such, two players can cooperate with each other to proceed the game.

Also, cases as illustrated in FIGS. 11A and 11B may occur in game play. FIGS. 11A and 11B illustrate the player object being surrounded by a plurality of enemy objects. As illustrated in FIG. 11A, the 3-D game screen 21 has the plurality of enemy objects E1 through E4 surrounding the player object P. In this case, the second player tries to help the first player, that is, the player object P, by operating the B button 4e of the hand-held game machine 4. Then, for example, the map window MW of the 2-D map screen 42 illustrated in FIG. 8A is switched to an item window IW of the 2-D map screen 42 illustrated in FIG. 12A. The item window IW has icons displayed thereon that correspond to items each for causing a specific phenomenon at the location of the second cursor C1 in the game space. The items are provided according to the types of specific phenomena occurring in the game space.

Figure 12A:
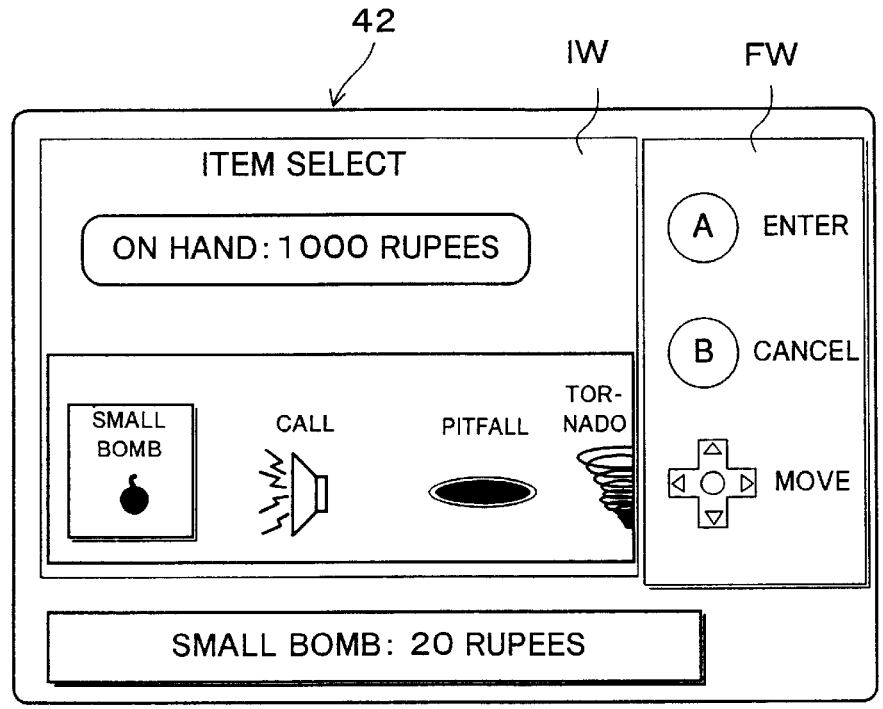
FIG. 12A and FIG. 12B are illustrations showing 2-D map screens with an item window being displayed.
Figure 12B:
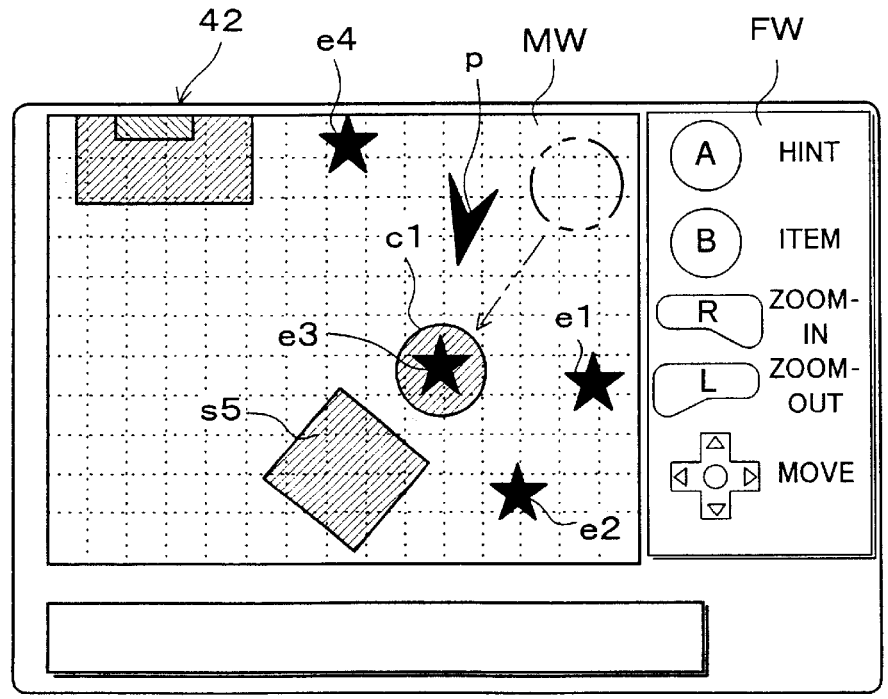

Furthermore, the item window IW displays the amount of rupees required for getting each item, and the amount of rupees possessed by the player object at this moment. Here, rupee is virtual currency in game space. By way of example only, the cross button 4a is used to select an icon indicating "small bomb", and then the A button 4d is used to activate the icon indicating "small bomb". Then, the item window IW is switched to the map window MW. For example, the 2-D map screen 42 illustrated in FIG. 12A is switched to a screen as illustrated in FIG. 12B. Then, the second player makes the first cursor c1 superposed onto the enemy object e3 on the map window MW, for example. At this time, on the 3-D game screen 21, the second cursor C1 is moved toward the enemy object E3 (refer to a double-dotted arrow in FIG. 11B). When the second player operates the A button 4d in predetermined timing, an explosion occurs at the location of the second cursor C1 in the 3-D game space. This explosion damages the enemy character E3 in the vicinity of the second cursor C1 (refer to FIG. 11B). Similarly, by damaging each enemy object, the player object can be made more predominant.

Note that the 3-D game screen exemplarily illustrated in FIG. 11A has a zoomed-out map 22 as a conventional one. This zoomed-out map 22 can be displayed or not displayed according to the intention of the first player. Also note that the procedure of designating an item and causing a specific phenomenon corresponding to the designated item to occur is not limited to the one according to the present embodiment described above.

Furthermore, by selecting an icon "call" displayed on the item window IW illustrated in FIG. 12, it is possible to turn the player object P to the second cursor C1 (not shown). At this time, it is more preferable that the virtual camera be turned to the direction of the second cursor C1.

Still further, another example of the specific phenomenon is generating a ground at a location indicated by the second cursor C1. Specifically, by selecting an icon "ground" (not shown), it is possible to create a ground at the location of the second cursor C1. At the location that became ground with the execution of the "ground" icon, a ground object L is regarded as being there, where the player object can stand still. For example, when there is a valley in the game space, a ground is generated between the peaks of the valley by a specific phenomenon, and with the use of the ground as a footing, the player object P can easily go over the valley.

With reference to FIGS. 13 through 18, processing carried out by the video game machine 3 and processing carried out by the hand-held game machine 4 in the game system 1 are specifically described.

When the video game machine 3 is powered ON, the CPU 301 and/or the GPU 303 of the video game machine 3 carries out the following steps. That is, in step S11, the boot program stored in the boot ROM (not shown) is executed to initialize each unit such as the main memory 304. Then, the game program (hereinafter simply referred to as "program") 32a is read through the DVD drive 32 into the main memory 304 for execution. In the following step S12, a communications program included in the program 32a is executed for negotiation with the hand-held game machine 4, thereby establishing communications. In step S13, the program for the hand-held game machine 4 stored in the DVD-ROM 32 is read. This program 32d is transmitted to the hand-held game machine 4. Then, when the hand-held game machine 4 starts executing the program 32d, game processing in step S14 is started, which will be described later.

When the hand-held game machine 4 is powered ON, the CPU 401 of the hand-held game machine 4 carries out the following steps. That is, in step S21, the boot program stored in the boot ROM (not shown) is executed to initialize each unit such as the working memory 402. Then, it is determined whether a game cartridge has been inserted or not, and if inserted, a game program stored in the inserted game cartridge is executed. If not inserted, which is the case of the present embodiment, it is checked whether any data has been sent to the communications port 407, and if there is any, reception of the data is started. If there is no data, the CPU 401 waits for the data to be sent. In step S22-Data for negotiation has been sent from the video game machine 3 to the communications port 407, and therefore reception of the data is carried out. Then, data for acknowledging receipt of the data for negotiation is sent to the video game machine 3. With this, negotiation is completed, and communications is established. In step S23, the program 32 sent from the video game machine 3 (refer to step S13) is received. The received program 32d is stored in the working memory 402. Then, once the program 32d is executed, game processing in step S24 is started, which will be described later.

Through the above-described steps, communications between the video game machine 3 and the hand-held game machine 4 is established, and the game programs are respectively executed by the respective CPUs. First, game processing carried out by the video game machine 3 is now described with reference to FIGS. 14 and 15.

In step S31, data for displaying the 2-D field map corresponding to the 3-D game space is sent to the hand-held game machine 4. Specifically, the 2-D object data 32e, the 2-D map data 32f of the first stage, and the strategy hint data g of the n-th stage are sent to the hand-held game machine 4. Here, n represents a stage's position in a sequence of stages of the game. In the above step S31, data of the first stage is sent at the time of starting the game, and once the first stage is cleared, data of the next stage is sent. In the following step S32, initial coordinates of the objects are sent for placing these objects on the 2-D field map.

In step S33, the CPU 301 reads the 3-D object data 32b, and the 3-D stage data 32c of the first stage from the DVD-ROM 32 to form a 3-D game space (refer to FIG. 5). This game space has the second cursor C1, etc., placed thereon, as described above. Then, the GPU 303 generates a 3-D game screen based on the virtual camera set in the game space.

In step S34, it is determined whether an instruction for moving the player object P has been issued. Specifically, the CPU 301 obtains operation data entered through the controller 31. At this time, if the operation data includes data indicating that the main stick 31a of the controller 31 has been operated, it is determined that an instruction for moving the player object P has been issued, and steps S35 and S36 are carried out. If the operation data does not include such data, step S37 is carried out. In step S35, the direction and 3-D new coordinates, such as (X1, Y1, Z1), of the player object are calculated according to values of the operation data of the main stick 31a (such values as becoming larger in proportion to the tilt of the main stick). In step S36, of the new 3-D coordinates (X1, Y1, Z1), only the 2-D components (X1, Y1) are extracted and sent to the hand-held game machine 4 as new 2-D coordinates. In the following step S37, the player object P is moved to the new 3-D coordinates (X1, Y1, Z1).

In step S38, it is determined whether any instruction for making the player object P take an action has been issued. Specifically, once the A button 31d assigned a function such as a jump is pressed, for example, the operation data to be sent from the controller 31 includes data indicating that the A button 31d has been pressed. By determining the presence or absence of such data, it is determined whether any instruction for making the player object P take an action has been issued. That is, when the operation data includes data about any button for making the player object P take an action, step S39 is carried out. In step S39, the player object P is made to take the action assigned to that button. In the following step S40, the enemy object E1 and other objects are made to take actions, and updates the coordinates of the locations of these objects. In step S41, new coordinates of the enemy object E1 and other objects are sent to the hand-held game machine 4.

In step S42, it is determined whether new coordinates of the second cursor C1 have been received from the hand-held game machine 4. If new coordinates have been received, step S43 is carried out. In step S43, based on the received new coordinates of the second cursor C1, the coordinates of the second cursor C1 is updated. Specifically, from the hand-held game machine 4, 2-D coordinates, such as (x1, y1), are sent from the hand-held game machine 4 as the new coordinates. The new coordinates (x1, y1) are 2-D coordinates, and therefore are transformed into 3-D coordinates, such as (X1, Y1, Z?). When "Z?" is a value equal to a height component (Z) representing a height of the surface of the geometry object, the second cursor C1 is always displayed on the surface of the geometry object. Note that, in addition to the height component of the geometry object, "Z?" may represent a height value indicating a height component of the location of the player character, for example. Furthermore, the location of the second cursor C1 is updated based on the new 3-D coordinates. With this updating, the second cursor is moved irrespectively of an input from the controller 32 (refer to the dotted arrow in FIG. 6 or the double-dotted arrow in FIG. 11B).

In step S44, it is determined whether an instruction for using an item at the location of the second cursor C1 has been issued. Specifically, determination in step S44 is made by determining whether an item command has been received from the hand-held game machine 4 and also whether an execution command for executing the use of the item has been received. The item command indicates, for example, a number unique to each item (item number). Note that the item command has been previously sent together with the 2-D map data and other data from the video game machine 3 to the hand-held game machine 4. If an item command and an execution command have been received, step S45 is carried out. In step S45, processing related to the second cursor is carried out, and the processing results are reflected on the game space. Specifically, by executing a program corresponding to the received item command, a specific phenomenon is caused to occur at the location of the second cursor C1. More specifically, for example, when the item command indicates "small bomb" (refer to FIG. 12A), an animated image representing an explosion is displayed approximately at the location of the second cursor C1, and processing for blowing off the enemy objects and other objects located within a predetermined range from the location of the second cursor C1 (explosion processing) is carried out (refer to FIG. 11B). Also, if the item command indicates "call" (refer to FIG. 12A), processing for changing the direction of the virtual camera VP (a focus of attention, for example) to the second cursor C1 (turning processing) is carried out.

Figure 16A:
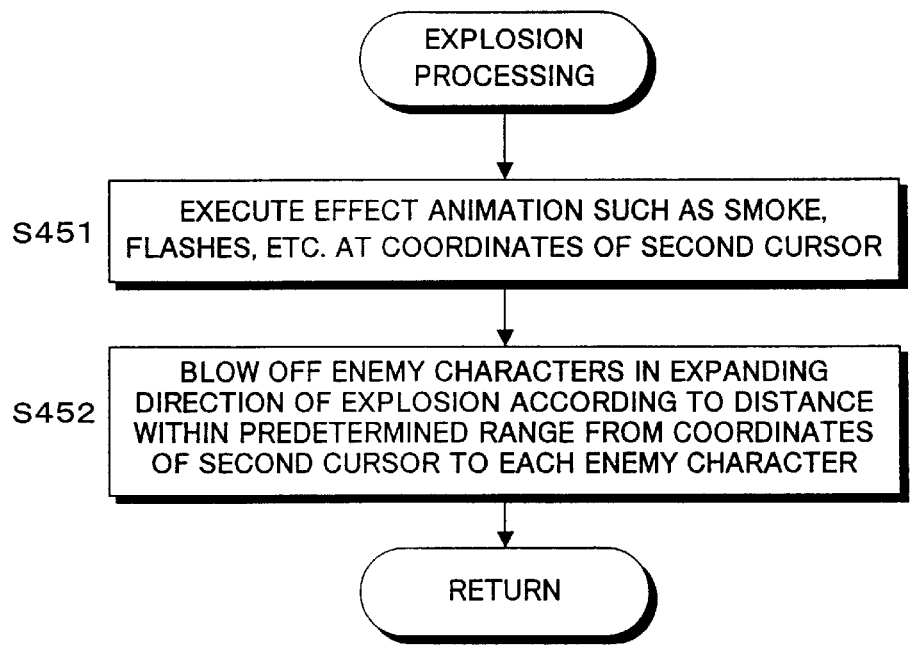
FIG. 16A is a flowchart of explosion processing carried out by the video game machine.
Figure 16B:
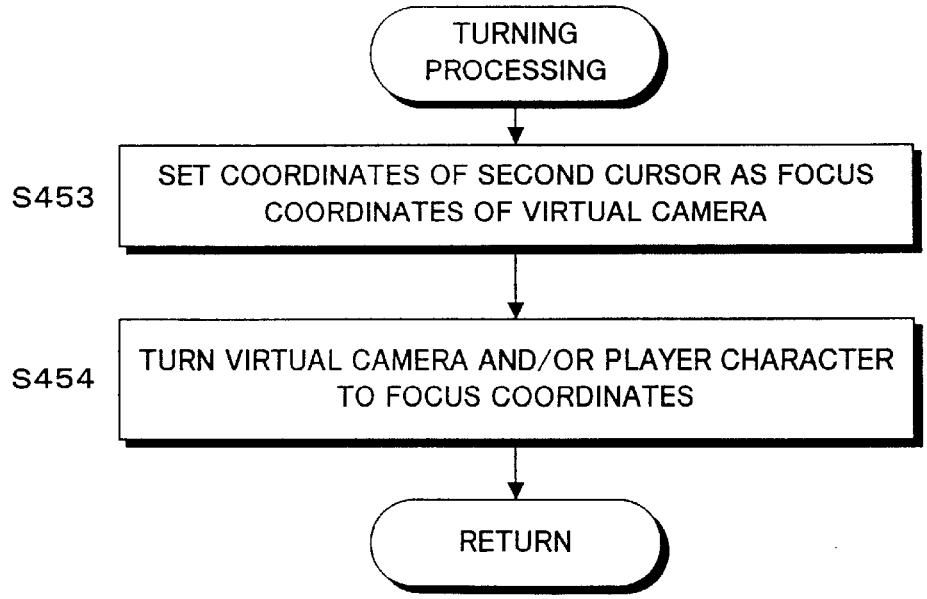
FIG. 16B is a flowchart of turning processing carried out by the video game machine.

FIG. 16A is a flowchart showing the details of explosion processing. In explosion processing, first in step S451, effect animation, such as smoke or flushes at the time of explosion, is executed at the location of the second cursor C1. In the following step S452, processing for blowing off the enemy in the expanding direction of the explosion according the distance from the location of the second cursor C1 to each of the enemy characters within a predetermined range. With this, the second player operating the first cursor can help the first player operating the player character to proceed the game. Next described is turning processing. FIG. 16B is a flowchart showing the details of turning processing. In turning processing, first in step S453, the coordinates of the second cursor C1 are set as focus coordinates of the virtual camera. In the following step S454, the virtual camera and/or the player character is turned to the direction of the focus coordinates. This can direct the attention of the first player to the direction of the focus coordinates.

Returning to FIG. 15, in step S46, it is determined whether the stage subjected to the preceding steps has been cleared. If cleared, the above-described steps S31 through S45 are repeated. In this case, data related to the next stage (the second stage if the first stage has cleared, for example) is used. If not cleared, that is, in the course of game play, the procedure repeats steps S31 through S45 until an instruction for ending the game is issued.

Figure 17:
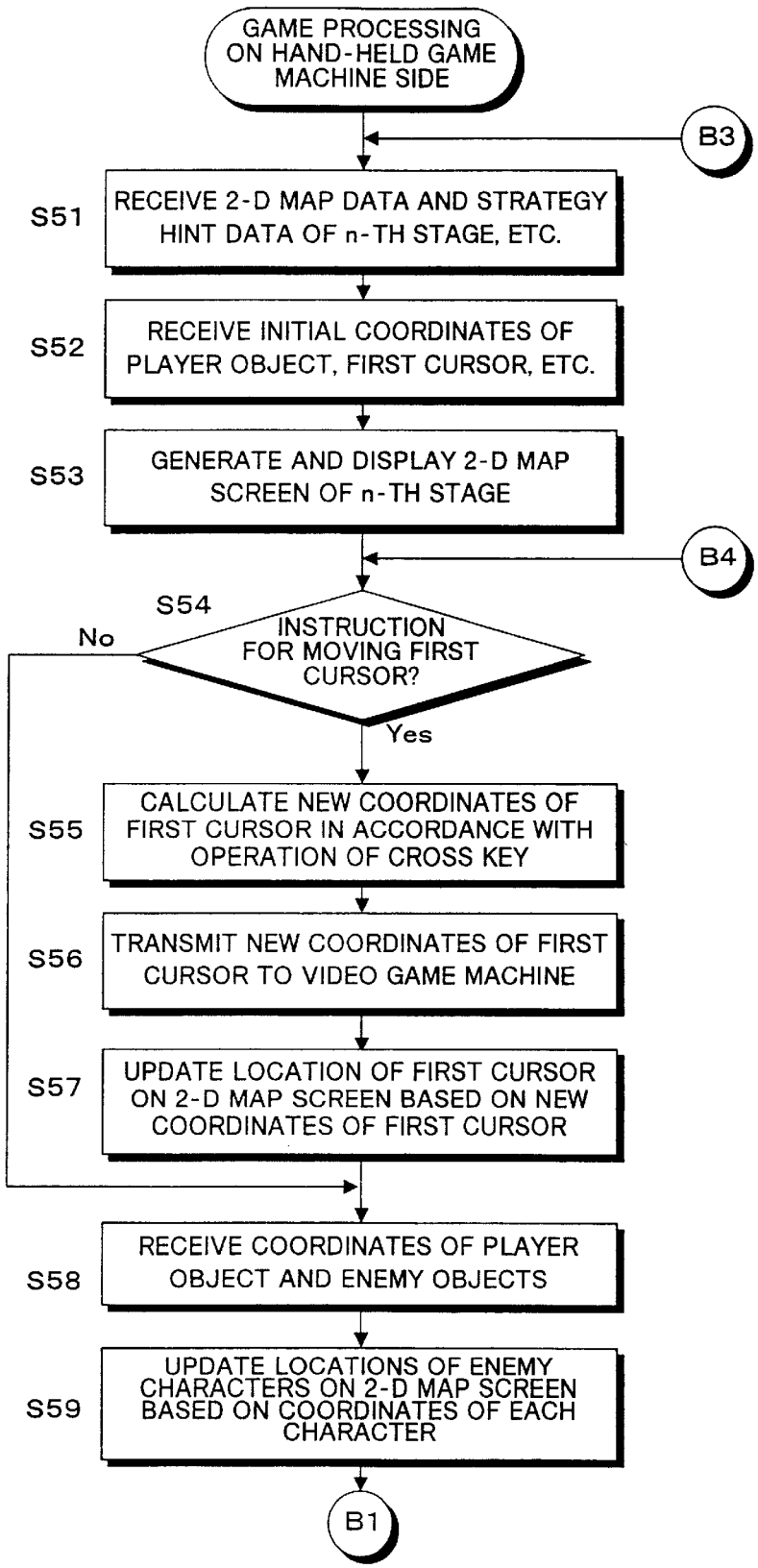
FIG. 17 is the first of three portions of a flowchart of a procedure to be followed by the hand-held game machine.
Figure 18:
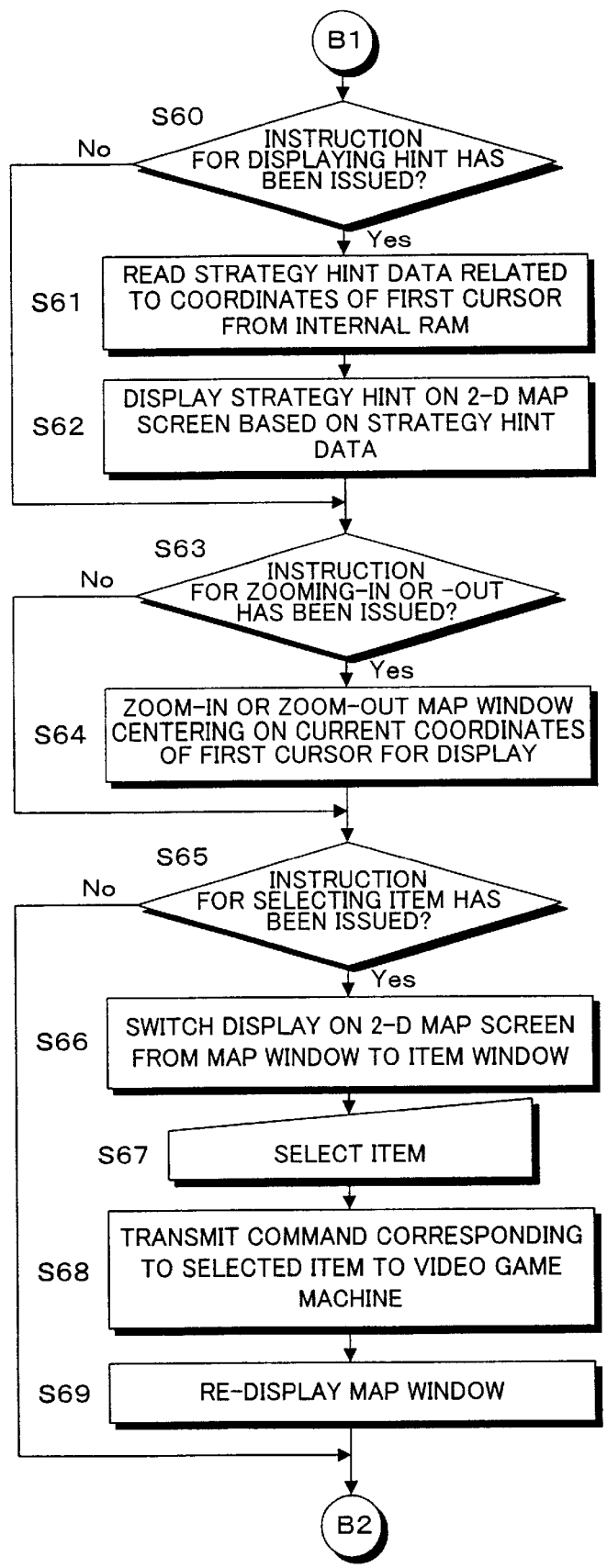
FIG. 18 is the second portion of the flowchart of the procedure to be followed by the hand-held game machine.
Figure 19:
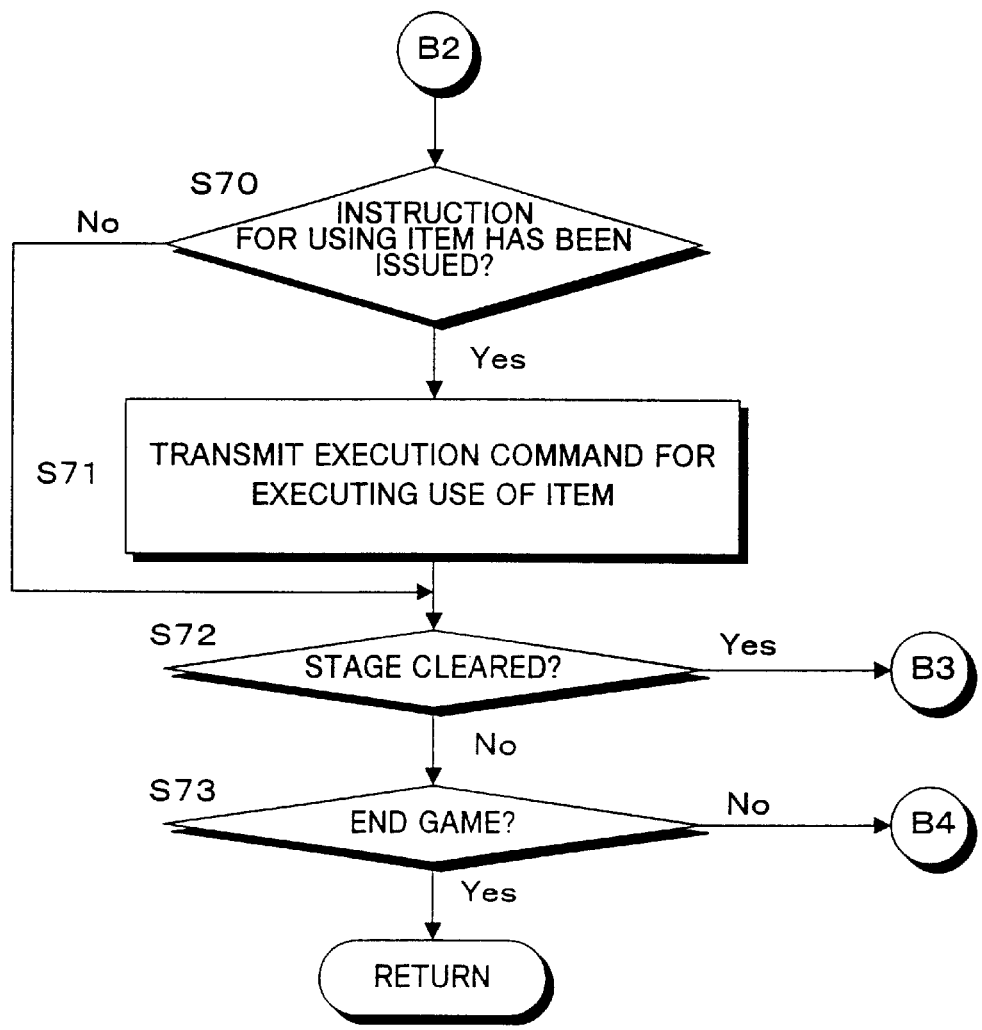
FIG. 19 is the last portion of the flowchart of the procedure followed by the hand-held game machine.

With reference to FIGS. 17 through 19, next described is game processing carried out by the hand-held game machine 4.

In step S51, the 2-D object data 32c, the 2-D map data 32f of the first stage, and the strategy hint data 32g of the first stage are received from the video game machine 3. In the following step S52, initial coordinates of each object are received.

In step S53, based on each data received from the video game machine 3, the 2-D map screen 42 including the 2-D field map FM is generated and displayed (refer to FIG. 8A, for example).

In step S54, it is determined whether an instruction for moving the first cursor has been issued, that is, whether the cross button 4a has been operated. Specifically, determination in step S54 is made by determining whether the operation data obtained through the controller I/F 404 includes data related to the cross button 4a. If the operation data includes data related to the cross button 4a, steps S55 through S57 are carried out. In step S55, based on which portion of the cross button 4a has been pressed, new coordinates of the first cursor c1 are calculated, such as (x, y). In step S56, the new coordinates of the first cursor c1 are sent to the video game machine 3 as new coordinates of the second cursor C1. In step S57, based on the new coordinates, the location of the first cursor c1 on the field map FM is updated. With this, the location of the first cursor c1 on the 2-D map screen 42 is moved (refer to FIG. 8B).

In step S58, new coordinates of the enemy object e1, the player object p, etc. are received from the video game machine 3. In step S59, based on the received new coordinates, the locations of the enemy object e1, the player object p, etc. are updated.

In step S60, it is determined whether an instruction for displaying a hint has been issued. Specifically, determination in step S60 is made by determining whether the operation data obtained through the controller I/F 404 includes data related to the A button 4d. If the operation data includes data related to the A button 4d, steps S61 and S62 are carried out. In step S61, the coordinates of the first cursor c1 when the A button 4d is pressed are obtained. Then, the strategy hint data 32g is searched for extracting a strategy hint related to these coordinates. At this time, if no strategy hint related to these coordinates is found, a strategy hint related to coordinates in the vicinity of the coordinates of the first cursor c1 is extracted. In step S62, the extracted strategy hint is displayed on the hint window of the 2-D map screen 42 (refer to FIG. 8, for example).

In step S63, it is determined whether an instruction for zooming-in or zooming-out the field map FM in the map window MW has been issued. Specifically, determination in step S63 is made by determining whether the operation data includes data related to the L button 4f or the R button 4g. In the following step S64, zoom-in or zoom-out processing is performed. Specifically, if the operation data includes data related to the R button 4g, an image centering approximately on the first cursor c1 within a predetermined range on the field map FM is cut out, and then displayed on the entire map window MW (refer to FIG. 9). If the operation data includes data related to the L button 4f, on the other hand, the field map FM covering a area wider than an area currently being displayed is displayed. Note that zoom-in or zoom-out display may be gradually made stepwise.

In step S65, it is determined whether an instruction for selecting an item has been issued. Specifically, determination in step S65 is made by determining whether the operation data includes data related to the B button 4e. If the operation data includes data related to the B button 4e, steps S66 through S69 are carried out. In step S66, display of the map window MW on the 2-D map screen 42 is switched to display of the item window IW (refer to FIG. 12A). In step S67, the player is made to select an icon corresponding to a desired item. In step S68, an item command corresponding to the item selected by the player is sent to the video game machine 3. In step S69, display of the item window IW is switched to display of the map window MW.

In step S70, it is determined whether an instruction for using an item has been issued. Specifically, determination in step S70 is made by determining whether the operation data obtained again after selecting the item includes data related to the B button 4e. In step S71, an execution command for using the item is sent. That is, when the B button 4e is operated after selecting the item, a specific phenomenon corresponding to the selected item occurs at the location of the second cursor C1 in the game space at this moment.

In step S72, it is determined whether the stage subjected to the preceding steps, for example, the first stage, has been cleared. Then, in step S73, it is determined whether the game ends. Here, although not particularly shown in the flowchart, data exchange between the video game machine 3 and the hand-held game machine 4 is carried out when appropriate for synchronization therebetween. For example, the hand-held game machine 4 also receives data indicating that the stage has been cleared. Therefore, in relation to processing of steps S46 and S47 in the video game machine 3, processing in steps S51 through S71 and processing 54 through S71, respectively, are repeated when appropriated.

In the above-described embodiment, the 3-D game screen is displayed on the television 2, while the 2-D map screen is displayed on the liquid crystal monitor 41. The present invention, however, can be achieved by such a display as illustrated in FIG. 20. As illustrated in FIG. 20, on the television 2, the 3-D game screen 21 and the 2-D map screen 42 are simultaneously displayed. Furthermore, this example of a game system illustrated in FIG. 20 does not require a hand-held game machine. The video game machine 3 has one or two controllers 31 connected thereto. When game play is performed by a single controller 31, the operation screen is switched by an operation of any one of operation buttons provided on the controller 31. When game play is performed by two controllers 31, on the other hand, one controller 31 is used for operating the player object P on the 3-D game screen 21, while the other controller 31 is used for operating the first cursor c1 on the 2-D map screen 42. With such structure, it is possible to perform game play by one or two persons even without having a hand-held game machine. In this case, the above-described steps S51 through S73 are carried out by the computer of the video game machine 3. Note that the present invention is not restricted to the above-described embodiment, but may be applied to a game system in which a location in 3-D game space is designated by designating a location on a 2-D screen. Furthermore, the second cursor is not necessarily visually unrecognizable, and may be translucent or transparent, for example, as long as it is set to be located in the 3-D game space correspondingly to the location of the first cursor. Furthermore, the second cursor may be moved in accordance with the movement of the player character when the first cursor is not operated by the player. Also in this case, as in the present embodiment, once the first cursor is operated by the player, the second cursor is moved correspondingly to the first cursor. Note that, when the second cursor is moved in accordance with the movement of the player character (while the first cursor is not operated by the player), the first cursor is moved in accordance with the second cursor (that is, player character).

Described next is a second embodiment of the present invention. The second embodiment is different from the first embodiment in game processing performed by the video game machine 3 and the hand-held game machine 4 (steps S14 and S24 illustrated in FIG. 13). In the following, the difference from the first embodiment is mainly described. Furthermore, in FIGS. 21 through 25, steps for performing the same processing as that in the first embodiment are provided with the same reference numbers.

Figure 21:
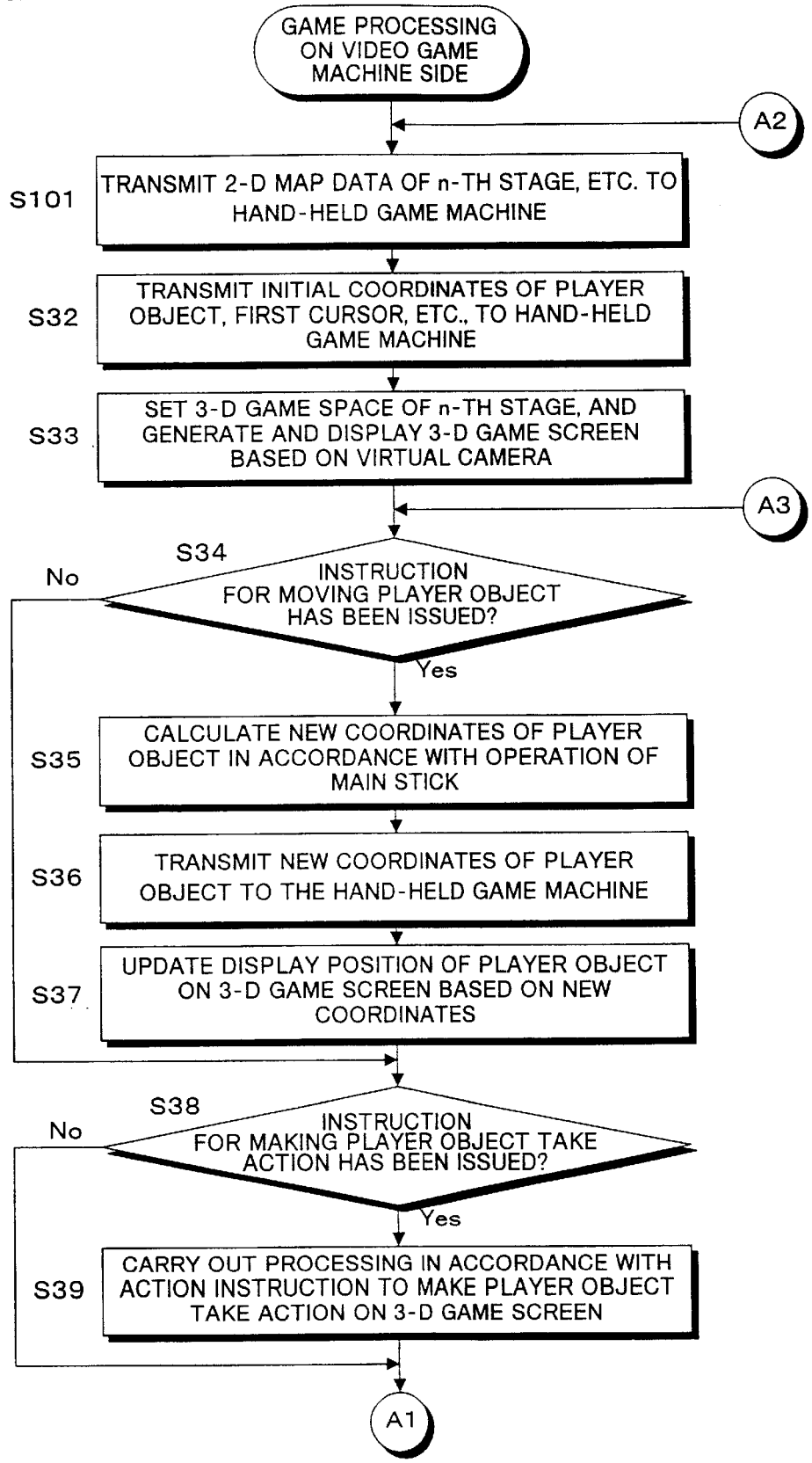
FIG. 21 is the first-half of a flowchart of a procedure to be followed by a video game machine according to the second embodiment of the present invention.
Figure 22:
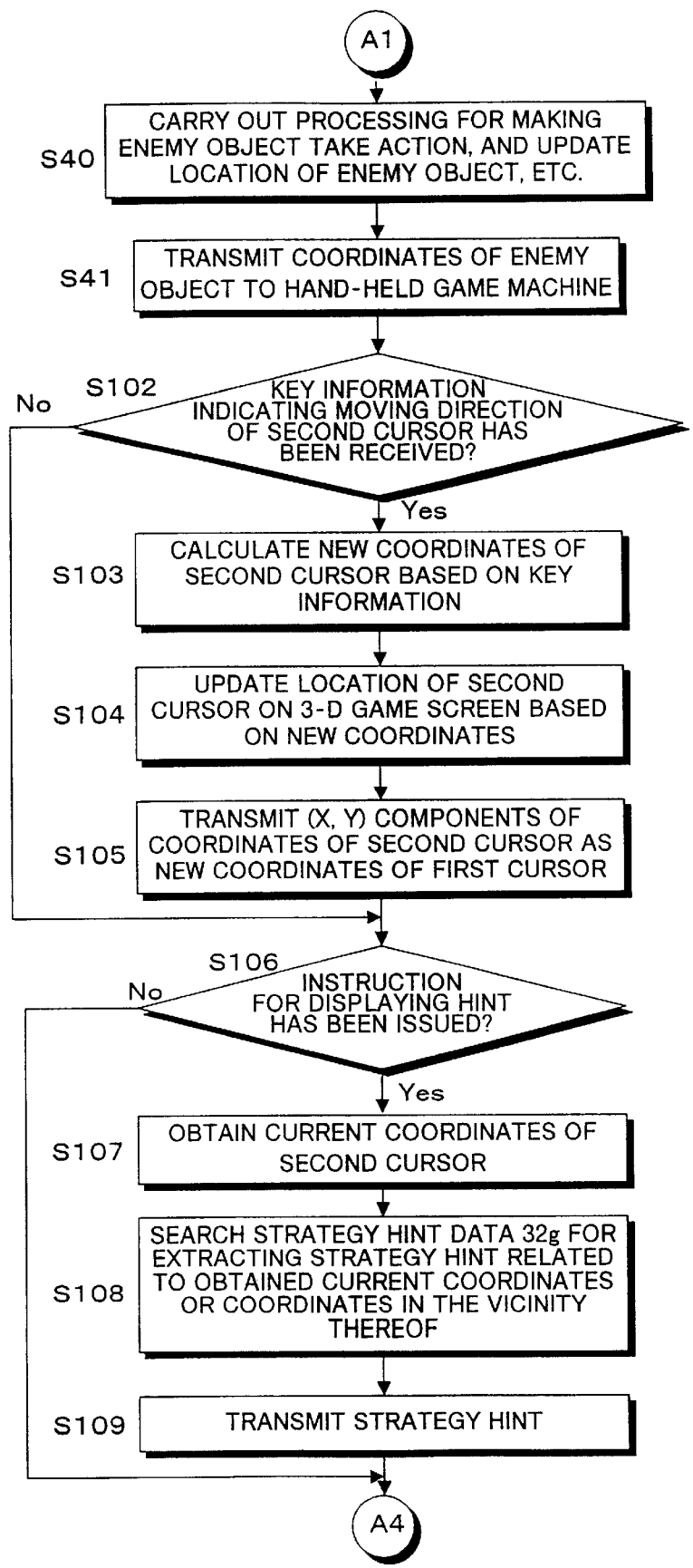
FIG. 22 is the last-half of the flowchart of the procedure to be followed by the video game machine according to the second embodiment.
Figure 23:
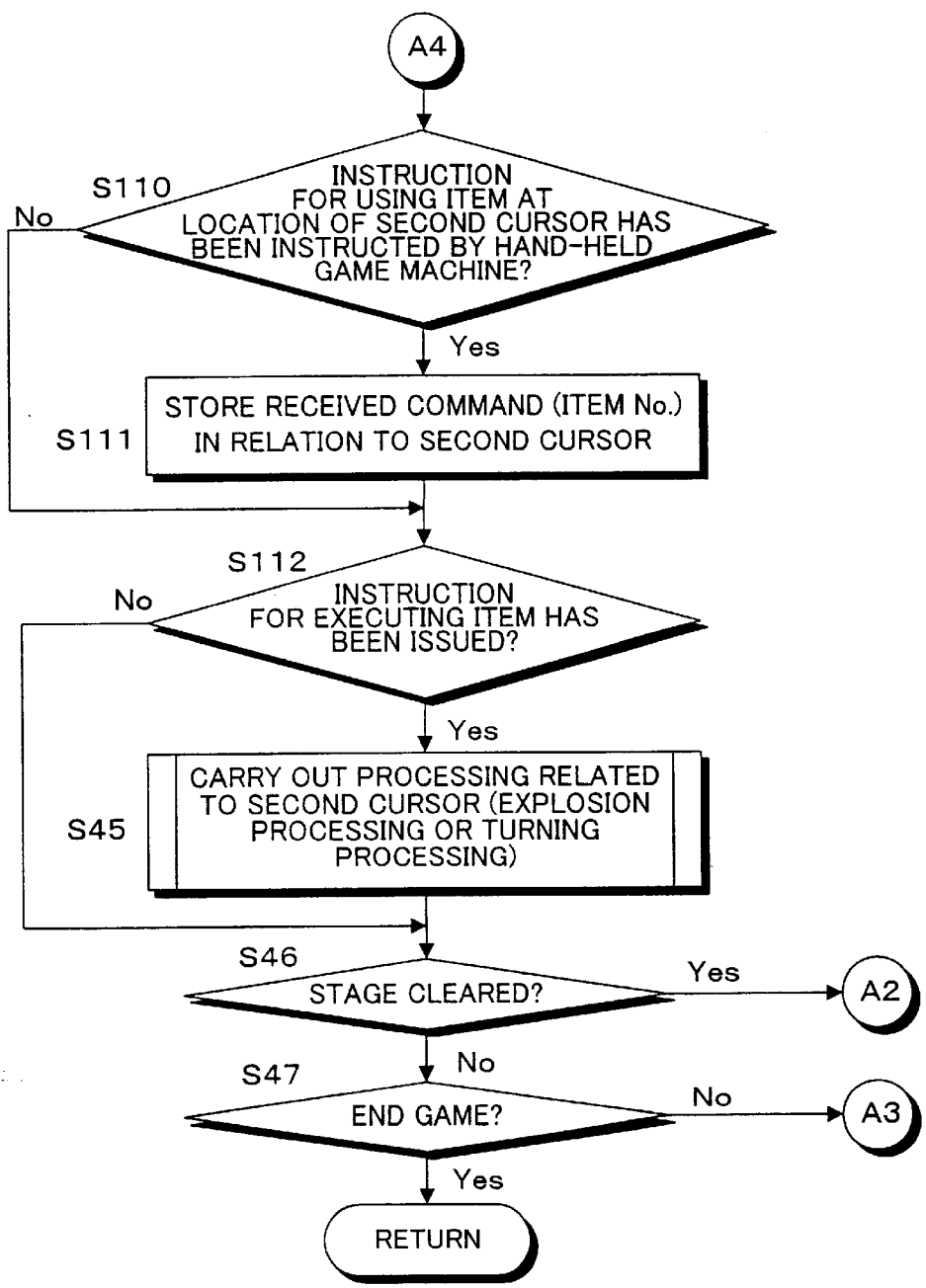
FIG. 23 is the last-half portion of a flowchart of another procedure followed by the video game machine according to the second embodiment.

First, with reference to FIGS. 21 through 23, processing performed by the video game machine 3 is described. In step S101, data for displaying the 2-D field map corresponding to the 3-D game space is sent to the hand-held game machine. Specifically, the 2-D object data 32e, and the 2-D map data 32f of the n-th stage are sent to the hand-held game machine. Note herein that, in the second embodiment, the strategy hint data g of the n-th stage is not sent in step S101. The strategy hint data g is sent when an instruction for displaying a hint is issued from the hand-held game machine 4. Processing in the following steps S32 through S41 are similar to that in the first embodiment, and therefore is not described herein.

In step S102, it is determined whether key information related to the moving direction of the second cursor C1 has been received from the hand-held game machine 4. Here, the key information to be received is operation data related to the cross button 4a of the hand-held game machine 4. If it is determined that the key information has been received, steps S103 through S105 are carried out. If it is determined that the key information has not been received, on the other hand, step S106 is carried out. In step S103, new 3-D coordinates of the second cursor C1 (such as (X1, Y1, Z?)) are calculated. Specifically, the X coordinate and the Y coordinate in the new 3-D coordinates (X1, Y1) are determined based on the key information received from the hand-held game machine 4. Also, the Z coordinate (Z?) in the new 3-D coordinates is determined based on, for example, a height component (Z) of the surface of the geometry object. Here, the value of the Z coordinate may indicate a height component of the surface of the geometry object, or a height component of the coordinates indicating the location of the player character. In the following step S104, the location of the second cursor C1 is updated based on the 3-D coordinates calculated in step S103. With this, irrespectively of inputs of the controller 31, the second cursor C1 is moved on the 3-D screen for display (refer to the dotted arrow in FIG. 6). Furthermore, in step S105, the X-axis component and the Y-axis component of the calculated 3-D coordinates are sent to the hand-held game machine 4 as new 2-D coordinates. By way of example only, when the calculated 3-D coordinates are (X1, Y1, Z1), (X1, Y1) are sent to the hand-held game machine 4.

In step S106, it is determined whether an instruction for displaying a hint has been issued. Specifically, determination in step S106 is made by determining whether a command for displaying a hint has been received from the hand-held game machine 4. If issued, steps S107 through S109 are carried out. If not issued, on the other hand, step S110 is carried out. In step S107, the coordinates of the second cursor C1 at the time of receiving the command for displaying the hint are obtained. In the following step S108, the strategy hint data 32g is searched for extracting a strategy hint related to the coordinates obtained in step S107. If no strategy hint related to the coordinates of the second cursor C1 is found, a strategy hint related to coordinates in the vicinity of the coordinates of the second cursor C1 is extracted. In step S109, the strategy hint extracted in step S108 is sent to the hand-held game machine 4.

In step S110, it is determined whether an instruction for using an item at the location of the second cursor C1 has been issued from the hand-held game machine 4. Specifically, determination in step S110 is made by determining whether the above-described item command has been received from the handheld game machine 4. If issued, step S111 is carried out. In step S111, the received item command is stored in relation to the second cursor C1.

In step S112, it is determined whether an instruction for executing the item has been issued. Specifically, determination in step S112 is made whether the above-described execution command has been received from the hand-held game machine 4. If received, step S45 is carried out. If not received, on the other hand, step S46 is carried out. Note that processing in steps S45 and thereafter in the video game machine 3 is similar to that in the first embodiment, and therefore is not described herein.

Figure 24:
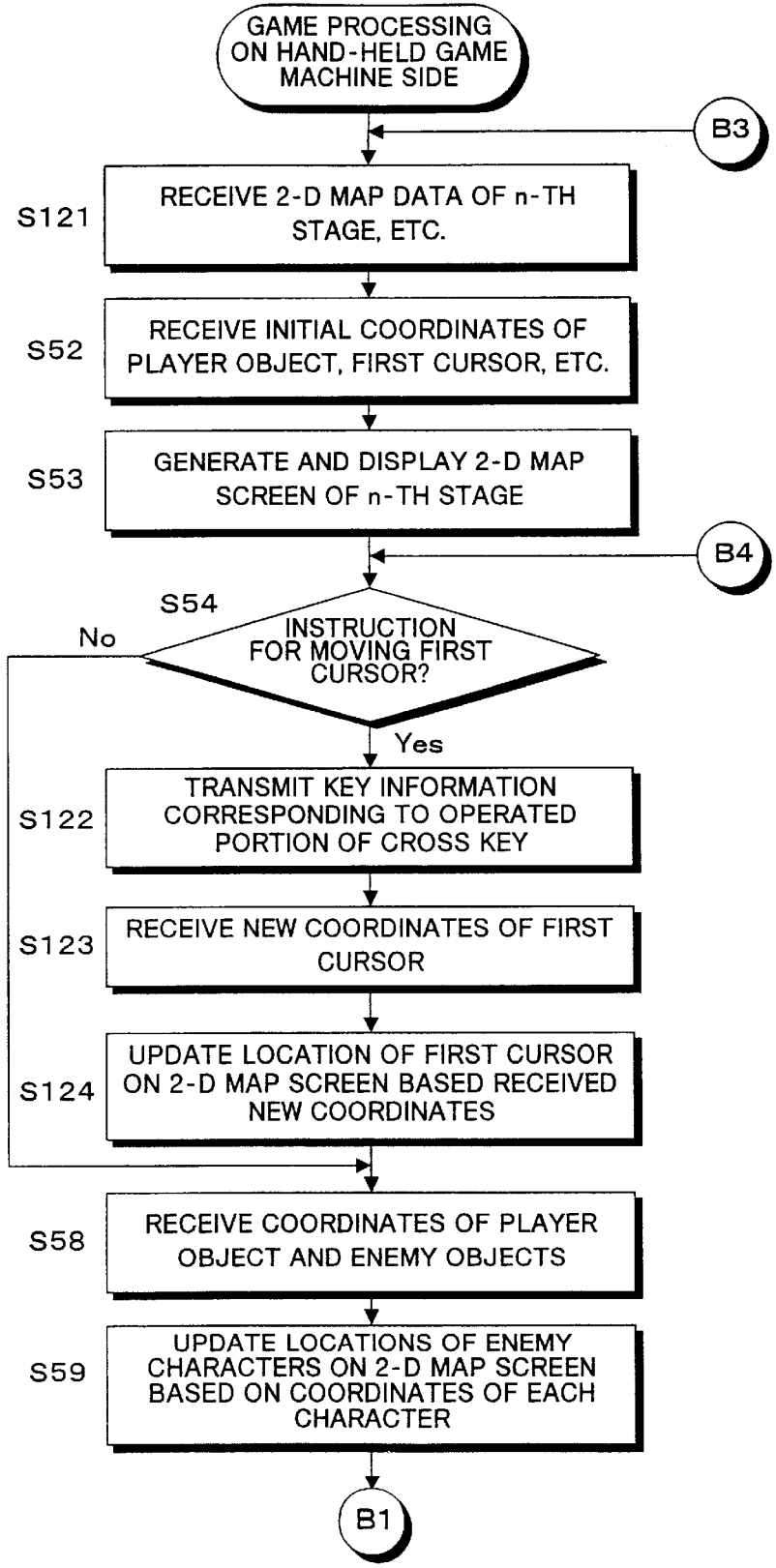
FIG. 24 is the first of three portions of a flowchart of a procedure to be followed by a hand-held game machine according to the second embodiment.
Figure 25:
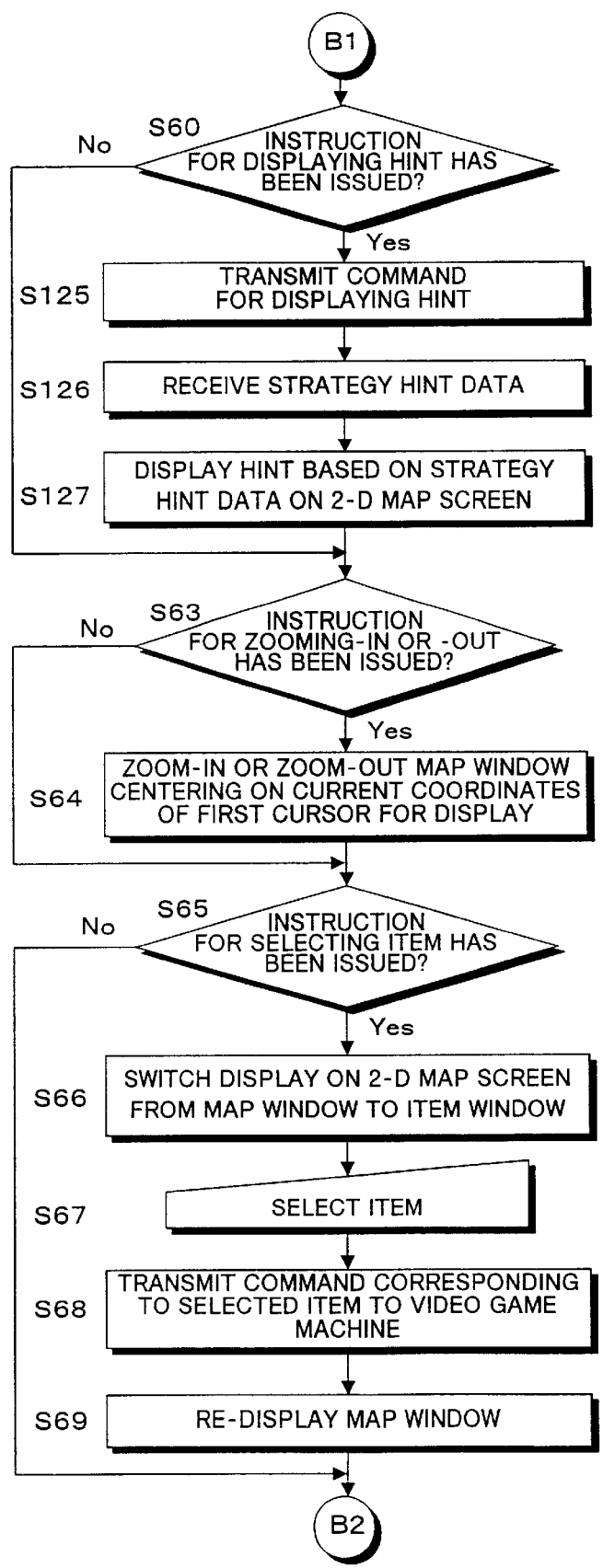
FIG. 25 is the second portion of the flowchart of the procedure to be followed by the hand-held game machine according to the second embodiment.

Next, with reference to FIGS. 24 and 25, processing performed by the hand-held game machine 4 is described. In step S121, the 2-D object data 32c and other data are received from the video game machine 3. Note that, in the second embodiment, the strategy hint data g is not received in step S121. In the following steps S52 through S54, processing similar to that in the first embodiment is performed.

In step S54, if an instruction for moving the first cursor has been issued (the cross button 4a is operated), steps S122 through S124 are carried out. In step S122, the operation data related to the cross button 4a is sent to the video game machine 3. As described above, processing in steps S102 through S105 is carried out (refer to FIG. 22) and, as a result, the X-axis component and the Y-axis component of the second cursor C1 are sent to the hand-held game machine 4. The hand-held game machine 4 receives, in step S123, the X-axis component and the Y-axis component of the second cursor C1 as new coordinates (x, y) of the first cursor c1. In the following step S124, based on the new coordinates (x, y) received from the video game machine 3, the location of the first cursor c1 on the field map FM is updated. With this, the location of the first cursor c1 on the 2-D map screen 42 is moved (refer to FIG. 8B).

Processing in steps S58 through S60 is similar to that in the first embodiment, and therefore is not described herein. Instep S60, if an instruction for displaying a hint has been issued (the A button 4d has been operated), steps S125 through 127 are carried out. In step S125, a command for displaying a hint is sent to the video game machine 3. As described above, the video game machine 3 performs steps S106 through S109 and, consequently, sends the strategy hint to the hand-held game machine 4. The hand-held game machine 4 receives, in step S126, the strategy hint from the video game machine 3. In the following step S127, the received strategy hint is displayed in the hint window HW on the 2-D map screen 42 (refer to FIG. 8, for example). Note that processing in steps S63 through S82 is similar to that in the first embodiment, and therefore is not described herein. Also, processing in steps S73 and thereafter is similar to that illustrated in FIG. 19, and therefore is not described herein.

While the invention has been described in detail, the foregoing description is in all aspects illustrative and not restrictive. It is understood that numerous other modifications and variations can be devised without departing from the scope of the invention.

What is claimed is:

1. A game system in which a 3-D game screen for displaying a state of a 3-D game space viewed from a predetermined viewpoint and a 2-D map screen for displaying at least part of a 2-D field map representing a plan view of the 3-D game space viewed from top are displayed, the game system comprising:
    a 2-D map screen display control section for displaying a 2-D map screen including a first cursor for indicating an arbitrary location on the 2-D field map;
    a cursor operating section operable by a player for moving the first cursor;
    a first cursor movement control section for moving the first cursor on the 2-D field map in accordance with an operation of the cursor operating section;
    a 3-D game screen display control section for displaying the 3-D game space including a second cursor for indicating a location in the 3-D game space corresponding to the location indicated by the first cursor on the 2-D field map; and a second cursor movement control section for moving the second cursor in the 3-D game space in relation to the movement of the first cursor on the 2-D field map.

2. The game system according to claim 1, further comprising:
a hint data storage section for storing hint data serving as a hint for proceeding a game in the 3-D game space, the hint data being related to a location on the 2-D field map;
a location designating section operable by the player for designating a desired location on the 2-D field map by using the first cursor; and
a hint display control section for reading the hint data related to the location designated by the location designating section from the hint data storage section, and displaying a hint based on the hint data.

3. The game system according to claim 2, wherein
when no hint data related to the location designated by the location designating section is found, the hint display control section displays a hint based on hint data related to a location within a predetermined range from the designated location.

4. The game system according to claim 1, further comprising:
a command display control section for making a specific phenomenon command displayed on the 2-D map screen, the specific phenomenon command for causing a specific phenomenon to occur in the 3-D game space;
a command selecting section operable by the player for selecting the displayed specific phenomenon command; and
a specific phenomenon causing section for causing, in relation to the second cursor in the 3-D game space, the specific phenomenon corresponding to the specific phenomenon command selected by the command selecting section to occur.

5. The game system according to claim 4, wherein
the specific phenomenon causing section causes, as the specific phenomenon, an explosion to occur at the location indicated by the second cursor.

6. The game system according to claim 4, wherein
the specific phenomenon causing section causes, as the specific phenomenon, a line of vision from the viewpoint to be turned to a direction of the second cursor.

7. The game system according to claim 4, wherein
the specific phenomenon causing section causes, as the specific phenomenon, a player character operable by the player to be turned to a direction of the second cursor.

8. The game system according to claim 1, further comprising:
a first display section; and
a second display section provided separately from the first display section, wherein
the 3-D game screen display control section makes the 3-D game space displayed on the first display section, and
the 2-D map screen display control section makes the 2-D map screen displayed on the second display section.

9. The game system according to claim 1, further comprising:
a player character operating section operable by the player for operating a player character appearing in the 3-D game space; and a player character action control section for controlling an action of the player character in the 3-D game space in accordance with an operation of the player character operating section, wherein
the cursor operating section and the player character operating section are separately provided on different controllers so as to be operable by different players.

10. A game system having a video game machine that causes a 3-D game space to be displayed on a home television receiver and a hand-held game machine communicably connected to the video game machine,
the hand-held game machine comprising:
a 2-D map image display control section for making a display device incorporated in the hand-held game machine display at least part of a 2-D field map representing a plan view of the 3-D game space viewed from top and having a first cursor superposed thereon for indicating an arbitrary location on the 2-D field map;
a cursor operating section operable by a player for moving the first cursor; and
a transmitting section for transmitting operation information indicating an operation of the cursor operating section to the video game machine, and
the video game machine comprising:
a 3-D game screen display section for making the home television receiver display a state of the 3-D game space viewed from a predetermined viewpoint and a second cursor for indicating a location in the 3-D game space corresponding to the location indicated by the first cursor on the 2-D field map;
a receiving section for receiving the operation information from the hand-held game machine; and
a second cursor movement control section for moving, based on the operation information received by the receiving section, the second cursor in the 3-D game space in relation to a movement of the first cursor on the 2-D field map.

11. The game system according to claim 10, wherein
the hand-held game machine further includes:
a hint data storage section for storing hint data serving as a hint for proceeding a game provided in the 3-D game space, the hint data being related to a plurality of locations on the 2-D field map;
a location designating section operable by the player for designating a desired location on the 2-D field map by using the first cursor; and
a hint display control section for reading the hint data related to the location designated by the location designating section from the hint data storage section, and displaying a hint based on the hint data.

12. The game system according to claim 11, wherein
when no hint data related to the location designated by the location designating section is found, the hint display control section displays, on the 2-D map screen, a hint based on hint data related to a location within a predetermined range from the designated location.

13. The game system according to claim 10, wherein
the hand-held game machine further includes:
a command display control section for making a specific phenomenon command displayed on the 2-D map screen, the specific phenomenon command for causing a specific phenomenon to occur in the 3-D game space; and a command selecting section operable by the player for selecting the displayed specific phenomenon command, and the video game machine further includes a specific phenomenon causing section for causing the specific phenomenon corresponding to the specific phenomenon command selected by the command selecting section to occur at a location of the second cursor in the 3-D game space.

14. A recording medium having a game program recorded thereon, the game program executable by a computer of a game system in which a 3-D game screen for displaying a state of a 3-D game space viewed from a predetermined viewpoint and a 2-D map screen for displaying at least part of a 2-D field map representing a plan view of the 3-D game space viewed from top are displayed, the game program causing the computer to execute the steps of:

displaying, on the 2-D map screen, a first cursor for indicating an arbitrary location on the 2-D field map;

moving the first cursor on the 2-D field map in accordance with an operation by a player;

displaying, on the 3-D game screen, a second cursor for indicating a location in the 3-D game space corresponding to a location indicated by the first cursor on the 2-D field map; and moving the second cursor in the 3-D game space in relation to a movement of the first cursor on the 2-D field map.

15. The recording medium according to claim 14, wherein the game program includes hint data serving as a hint for proceeding a game provided in the 3-D game space, the hint data being related to a plurality of locations on the 2-D field map, and the game program further causes the computer to execute the steps of:

making the player designate a desired location on the 2-D field map by using the first cursor; and displaying a hint based on the hint data related to the designated location.

16. The recording medium according to claim 15, wherein in the hint displaying step, when no hint data related to the location designated by the first cursor is found, a hint based on hint data related to a location within a predetermined range from the designated location is displayed.

17. The recording medium according to claim 14, wherein the game program further causes the computer to execute the steps of:

displaying, on the 2-D map screen, a specific phenomenon command for causing a specific phenomenon to occur in the 3-D game space; and causing the specific phenomenon corresponding to the specific phenomenon command when selected by the player to occur at a location of the second cursor in 3-D game space.

18. The recording medium according to claim 17, wherein in the specific phenomenon causing step, an explosion is caused to occur as the specific phenomenon at the location of the second cursor.

19. The recording medium according to claim 17, wherein in the specific phenomenon causing step, as the specific phenomenon, a line of view from the viewpoint is turned to a direction of the second cursor.

20. The recording medium according to claim 17, wherein in the specific phenomenon causing step, as the specific phenomenon, a player character operable by the player is turned to a direction of the second cursor.

21. The recording medium according to claim 14, wherein the game system includes a video game machine that makes the 3-D game space displayed on a home television receiver, and a hand-held game machine communicably connected to the video game machine, and the game program is executed by a computer of the video game machine and a computer of the hand-held game machine to make the 3-D game screen displayed on the home television receiver and to make the 2-D map screen displayed on a display device incorporated in the hand-held game machine.

22. The recording medium according to claim 14, wherein the game program further causes the computer to execute a step of controlling an action of a player character appearing in the 3-D game space, and in the first cursor moving step and the player character action controlling step, operation instructions from different controllers are accepted so as to allow operations by different players.

* * * * *